United States Patent [19]

Canniff

[11] 4,380,810
[45] Apr. 19, 1983

[54] LOOPBACK TEST

[75] Inventor: Ronald J. Canniff, Naperville, Ill.

[73] Assignee: Bell Telephone Laboratories, Incorporated, Murray Hill, N.J.

[21] Appl. No.: 186,619

[22] Filed: Sep. 12, 1980

[51] Int. Cl.³ ............................................... H04J 3/14
[52] U.S. Cl. ...................................... 370/15; 370/56; 179/175.3 R
[58] Field of Search ...................... 370/15, 14, 13, 56, 370/80; 179/175.3 R, 18 FC

[56] References Cited

U.S. PATENT DOCUMENTS

| | | | |
|---|---|---|---|
| 3,892,923 | 7/1975 | Ranner | 370/15 |
| 4,064,369 | 12/1977 | Battocletti | 370/14 |
| 4,070,648 | 1/1978 | Mergenthaler et al. | 340/146.1 BE |
| 4,232,386 | 11/1980 | McDonald et al. | 370/68 |
| 4,279,032 | 7/1981 | Smith | 370/15 |

*Primary Examiner*—Douglas W. Olms
*Attorney, Agent, or Firm*—R. O. Nimtz

[57] ABSTRACT

A digital concentrator system for use with a plurality of digital carrier systems in the telephone subscriber loop plant is disclosed. The concentrator system comprises a central office terminal (100), a remote terminal (102), and an interconnecting digital carrier path (108). In the transmit direction at each terminal (110,112), a plurality of multiplexed encoded signal streams are demultiplexed and the encoded signals stored. A selected number of encoded signals are retrieved and multiplexed for transmission to a distant terminal (112,110) as a concentrated pulse stream (123,175). In the receive direction at each terminal (110,112), the encoded signals in the multiplexed concentrated stream (125,177) are demultiplexed and stored. The stored encoded signals are retrieved and the original number of encoded signal streams derived for transmission to the carrier terminal (100,102). Supervisory and control communication between the two concentrator terminals (110,112) is achieved by way of data messages on a derived data link. Operation between the transmit and receive directions at each terminal is asynchronous and controlled by a microcomputer (124,160). A PCM looping test for determining that a continuous path exists through the digital concentrator system is included.

12 Claims, 26 Drawing Figures

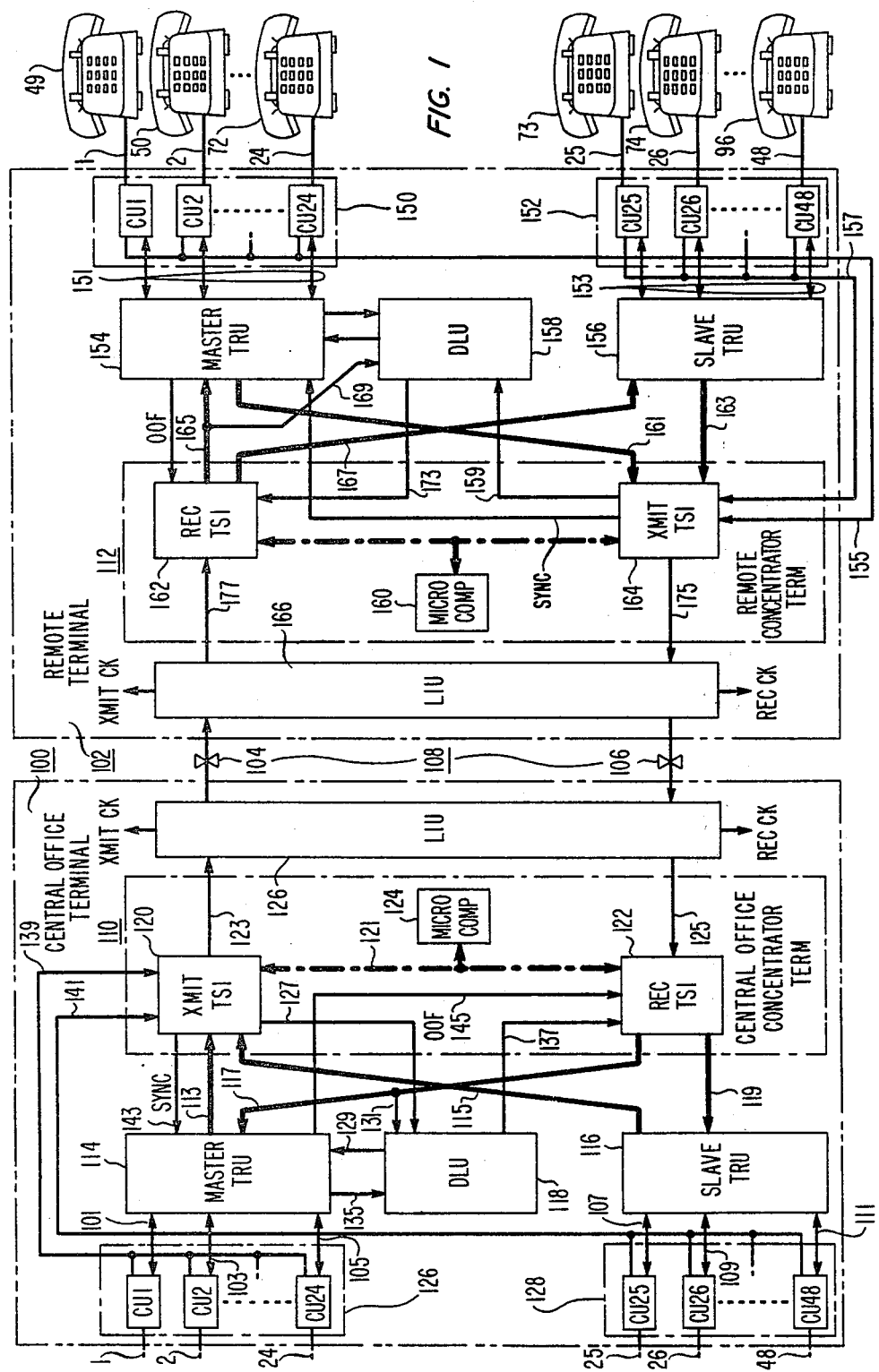

FIG. 2

CONCENTRATOR MESSAGES
COT → RT

| I. TRUNK ASSIGNMENT | TRUNK ID 5 BITS | LINE ID 6 BITS | (REPEAT) | (REPEAT) |
|---|---|---|---|---|
| | FIELD 1 | FIELD 2 | WORD 2 | WORD 3 |
| | WORD 1 | | | |

| II. TRUNK DEASSIGNMENT | TRUNK ID 5 BITS | DEASSIGNMENT CODE 6 BITS | (REPEAT) | (REPEAT) |
|---|---|---|---|---|

| III. ASSIGNMENT UPDATE | HEADER A | TRUNK ID | LINE ID | COMPLEMENT OF TRUNK ID LINE ID |
|---|---|---|---|---|

| IV. LOOPING TEST | HEADER A | REQUEST CODE B | COMPLEMENT |
|---|---|---|---|

| V. ACTIVITY UPDATE REQUEST | REQUEST CODE C | (REPEAT) | (REPEAT) |
|---|---|---|---|

| VI. IDLE | IDLE CODE D |
|---|---|

FIG. 3

CONCENTRATOR MESSAGES
RT → COT

| I. ACTIVITY | LINE GROUP ID 3 BITS | ACTIVITY 8 BITS | (REPEAT) | (REPEAT) |
|---|---|---|---|---|

| II. ACTIVITY UPDATE | HEADER A | COMPLEMENT OF LINE GROUP LINE ACTIVITY | LINE GROUP ID | ACTIVITY |
|---|---|---|---|---|

| III. NO ALARM | NO ALARM CODE E | (REPEAT) | (REPEAT) |
|---|---|---|---|

| IV. LOOPING TEST | HEADER A | COMPLEMENT OF REQUEST CODE B | REQUEST CODE B |
|---|---|---|---|

| V. ASSIGNMENT UPDATE REQUEST | REQUEST CODE C | (REPEAT) | (REPEAT) |
|---|---|---|---|

| VI. IDLE | IDLE CODE D |
|---|---|

TRANSMIT TSI TIMING WAVEFORMS

RECEIVE TSI TIMING WAVEFORMS

TIME SLOT INTERCHANGER

FIG. 9

TRANSMIT TSI SECTION 3 STORAGE MAP

| | | | |
|---|---|---|---|
| 903 | ⋮ | | |
| | (REPEAT) | | |
| | CLASS OF SERVICE WORD | | |
| 902 | ⋮ | | |
| | (REPEAT) | | |
| | ACTIVITY WORD | | |
| 901 | | | (REPEAT) | TRUNK 24 |
| | | | ⋮ | |
| | | | (REPEAT) | TRUNK 3 |
| | | | (REPEAT) | TRUNK 2 |
| | X | Y | (LINE ID) | TRUNK 1 |

FIG. 10

RECEIVE TSI SECTION 3 STORAGE MAP

| | | | | |
|---|---|---|---|---|
| 1003 | FAST-BUSY BUFFER WORD | | | |
| 1002 | LINE ID | | | BUSY TRUNK 24 |
| | ⋮ | | | |
| | LINE ID | | | BUSY TRUNK 3 |
| | LINE ID | | | BUSY TRUNK 2 |
| | LINE ID | | | BUSY TRUNK 1 |
| 1001 | | | (REPEAT) | TRUNK 24 |
| | | | ⋮ | |
| | | | (REPEAT) | TRUNK 3 |
| | | | (REPEAT) | TRUNK 2 |
| | X | Y | LINE ID | TRUNK 1 |

MICROCOMPUTER RAM DATA STORAGE MAP

SEQUENCER

SUPERVISION COLLECTION CIRCUITRY

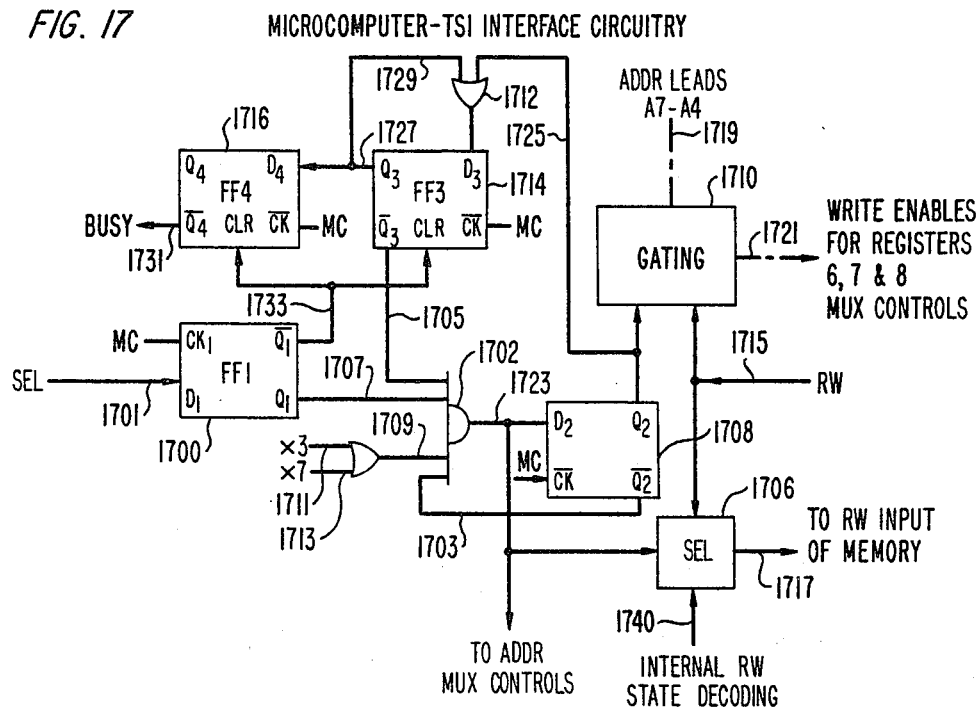
FIG. 17  MICROCOMPUTER-TSI INTERFACE CIRCUITRY
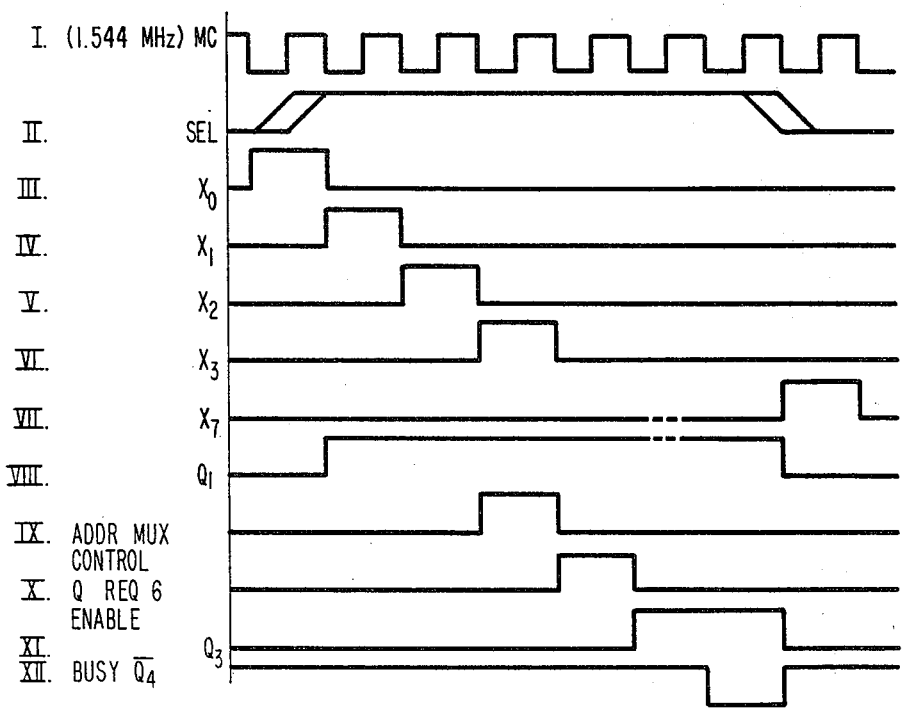
FIG. 18  TIMING FOR A MEMORY READ

DATA-LINK CLOCK CIRCUIT

DATA-LINK SIGNALS

REFRAME CIRCUITRY AND TIMING

LOOPBACK TEST

BACKGROUND OF THE INVENTION

1. Field of the Invention

This invention relates to real time testing for continuity in transmission paths through a digital concentrator in subscriber loop digital carrier transmission systems.

2. Description of the Prior Art

Testing for continuity in the path through a telephone switching office has been known for a long time. However, these tests usually involve the use of additional equipment, even for testing in time division multiplex switching offices. One such method is disclosed in U.S. Pat. No. 4,064,369 granted to Mr. Frank E. Battocletti on Dec. 20, 1977.

Similarly, in the subscriber loop plant using digital multiplexed transmission systems, it is likewise desirable to test the path through a digital trunk prior to establishing a talking connection.

SUMMARY OF THE INVENTION

In accordance with the illustrative embodiment of the present invention, a looping test is performed to test the assigned transmission path for continuity and to test the associated equipment just prior to establishing the connection for every call.

More particularly, such continuity testing for concentrated pulse code modulated (PCM) transmission paths is accomplished using the same terminal equipment necessary for establishing the initial connection assignment. Even more particularly, the assignment sequence includes a preconnection test subsequence in which test codes are exchanged between the two terminals of the system during a time-out interval. Failure to successfully complete the subsequence within the time-out interval interrupts the assignment sequence and forces the test to be repeated periodically until the fault is cleared.

BRIEF DESCRIPTION OF THE DRAWING

FIG. 1 is a general block diagram of a digital concentrator for a subscriber loop digital transmission system using a plurality of pulse code modulated (PCM) bit streams, FIG. 2 is a graphic diagram of the data messages transmitted from the central office terminal of the concentrator system of FIG. 1 to the remote terminal;

FIG. 3 is a graphic diagram of the data messages transmitted from the remote terminal of the concentrator system of FIG. 1 to the central office terminal;

FIG. 9 is a storage map for the section of the transmit time slot interchanger;

FIG. 10 is a storage map for a section of the random access memory in the receive time slot interchanger of FIG. 7;

FIG. 17 is a detailed block diagram of the microcomputer—time slot interchanger interface circuitry shown in the common control of FIG. 14;

FIG. 18 is a timing diagram for the microcomputer—time slot interchanger interface circuitry shown in FIG. 17;

DETAILED DESCRIPTION

Concentrator System

Figure 4:
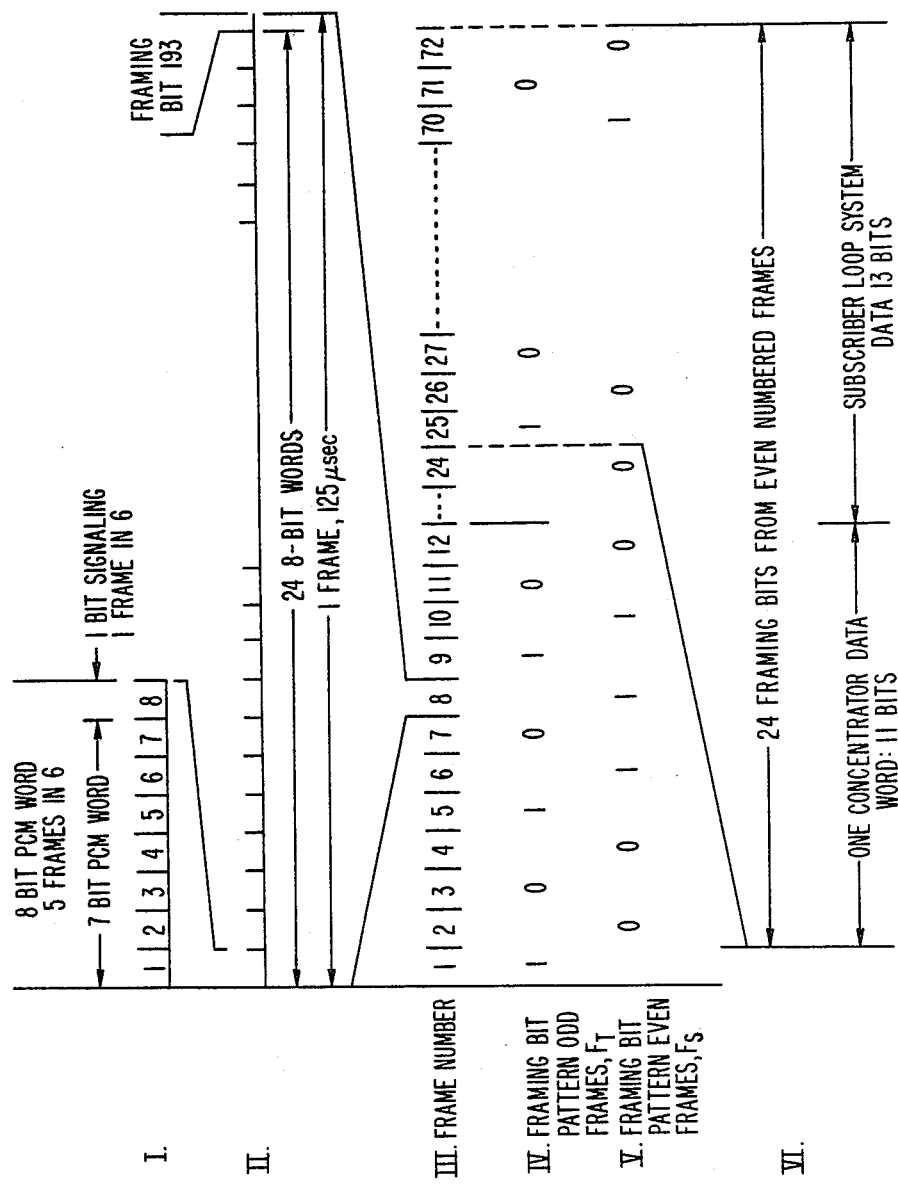
FIG. 4 is a timing diagram showing how the data message link is derived for the concentrator system of FIG. 1.

FIG. 1 is a general block diagram representation of a storage and retrieval concentrator system comprising a central office terminal (COT) 100, a PCM digital transmission facility 108, and a remote terminal (RT) 102.

Referring more particularly to COT 100, there is shown a first group 126 of twenty-four so-called "D-type" channel units CU1, CU2,-CU24 for periodically producing and receiving pulse amplitude modulation (PAM) samples from voice messages on lines 1, 2,-24, respectively, for producing per line signaling information, and for producing per line class of service information (herein called "transmit not enable" (TNEN) signals). A second group 128 of twenty-four D-type channel units CU25, CU26,-CU48 performs a similar function for lines 25,26,-48. A more detailed description of the D-type channel units can be found in U.S. Pat. No. 4,059,731 granted to J. H. Green and J. E. Landry on Nov. 22, 1977.

The first group 126 of channel units is connected with a master transmit-receive unit (master TRU) 114 through leads 101, 103,-105 for bidirectional PAM transmission. Similarly, the second group 128 of channel units is connected with a slave transmit-receive unit (slave TRU) 116 through leads 107, 109,-111 for bidirectional PAM transmission.

In the transmit direction, the master TRU 114 performs the functions of generating timing pulses to direct sampling and supervision by the first group of channel units 126, encoding the PAM samples from the first group of channel units 126 into PCM code groups, multiplexing the PCM code groups to form a PCM bit stream, and inserting framing bits into the PCM bit stream to derive a multiplexed digital pulse stream, sometimes referred to as a DS1 signal. In the receive direction, the master TRU 114 performs the functions of demultiplexing the received DS1 PCM bit stream to derive the separate PCM code groups, decoding the PCM code groups into PAM samples, and extracting the timing, framing, and signaling information. The slave TRU 116 performs similar functions for the second group of channel units 128. A more detailed description of the transmit-receive units 114 and 116 can be found in the above-mentioned Green et al patent.

Both TRU 114 and TRU 116 are connected to a transmit time slot interchanger (transmit TSI) 120 by leads 113 and 115, respectively, for transmission of the outgoing multiplexed PCM streams. A central office terminal concentrator (COT concentrator) 110 comprises the transmit TSI 120, a receive time slot interchanger (receive TSI) 122 and a microcomputer 124, interconnected by a bus 121 for address and data communication. The receive TSI 122 and the TRU's 114 and 116 are connected by leads 117 and 119, respectively, for transmission of incoming multiplexed PCM bit streams.

The multiplexed outgoing PCM bit streams on leads 113 and 115 are demultiplexed at the transmit TSI 120 and the PCM code groups are individually stored. Up to twenty-four of the stored PCM samples are selectively retrieved from the transmit TSI 120, multiplexed, and the framing bit from the PCM bit stream on lead 113 inserted to derive a concentrated PCM bit stream for transmission on lead 123 to the remote terminal concentrator (RT concentrator) 112. Each of the twenty-four PCM samples selectively retrieved from the transmit TSI 120 is assigned to a unique one of the twenty-four time slots available in each frame on transmission facility 108. Each time slot in facility 108 is referred to as a concentrator trunk.

The assignment of a subscriber line to a concentrator trunk is controlled by the microcomputer 124 at the COT concentrator 110. The assignment information is transmitted to the RT concentrator 112 for duplicating the same assignments at the remote terminal. This assignment information is transmitted from the COT concentrator 110 to the RT concentrator 112 via data messages. These data messages are assembled at the microcomputer 124 and transmitted through the transmit TSI 120 embedded, as will be described, in the concentrated PCM bit stream. Similarly, other information is transmitted between the concentrator terminals 110 and 112 via data messages.

DATA LINK MESSAGES

Central Office Terminal to Remote Terminal

Referring temporarily to FIG. 2, there are shown a plurality of concentrator data messages that are transmitted from COT concentrator 110 to RT concentrator 112. Message I is a trunk assignment data message comprising three words. Each word comprises 11 bits divided into two fields. The first field comprises five bits for a trunk identification number ($2^5=32$). The second field comprises six bits for the line identification number that is assigned to the trunk identified in the first field ($2^6=64$). The second and third words repeat the same information contained in the first word, protecting against errors in transmission by triple redundancy. If the RT concentrator 112 receives two out of the three words which match, it assumes the message has been correctly received.

Message II comprises a data message to convey trunk deassignment information. There are again three words, each comprising two fields. The first field is a trunk identification field comprising five bits. The second field is a line identification deassignment code comprising six bits. To protect against errors in transmission, the information contained in the first word is repeated in the second and third words.

Message III is a data message for an assignment update. Assignment update messages are sent periodically to assure that the recorded assignment at the RT concentrator 112 is accurate. The assignment update message comprises three words. The first word is a distinguishable header A. The second word comprises two fields. The first field is a trunk identification field comprising five bits and the second field comprises six bits, representing the line identification assigned to the trunk in the first field. Word three comprises the complement of the second word for error protection.

Message IV is a data message for a data link looping test. The data link looping test (not to be confused with the PCM looping test which will be described in detail later and which is performed after trunk assignment but before establishing connection at the beginning of every call) is an autonomous test for verifying the integrity of the data link connection itself. This message is sent from the COT concentrator 110 to the RT concentrator 112 and, as will be described in connection with FIG. 3, Message IV, is transmitted back from the RT concentrator 112 to the COT concentrator 110 to establish the integrity of the data link. If either terminal does not receive the looping test message at least once every second, an alarm is sounded. The looping data link test message IV comprises three words, each having eleven bits. The first word is the header A. The second word comprises a distinguishable request code B; and the third word is a compliment of the request code B in the second word, again, for error protection.

Message V is a data message for an activity update request. Activity information refers to the on-/off-hook status of the subscriber stations and is part of the line-associated signaling information mentioned earlier in connection with FIG. 1. Periodically, activity information stored in the transmit TSI 120 and in the microcomputer 124 is updated. Activity information generated at the remote terminal must be transmitted from the remote terminal to the central office terminal because all assignment decisions are made at the COT concentrator 110. In response to a command from the microcomputer 124, an activity update request is transmitted to RT concentrator 112. The activity update request Message V is a data message comprising three words, each eleven bits long. The first word is a distinguishable request code C. Words two and three of Message V are repeats of the request code C in word one.

Message VI is a data message representing an idle state. The idle message comprises a word eleven bits long for transmission of an idle code D. An idle code is transmitted repetitively whenever none of the other data messages are being transmitted.

REMOTE TERMINAL TO CENTRAL OFFICE TERMINAL

Referring temporarily to FIG. 3, there are shown the data messages that are transmitted from the RT concentrator 112 to the COT concentrator 110. Message I represents an activity data message for activity information to be transmitted from RT concentrator 112 to COT concentrator 110. Activity, as stated earlier, represents the on-/off-hook status of the subscriber stations. Activity information is transmitted from the RT concentrator 112 in response to a change in status of a subscriber line, as will be described hereinafter.

The activity Message I of FIG. 3 comprises three words. The first word comprises two fields. The first field identifies a line group and comprises three bits. Lines 1, 2–48 are divided, for convenience, into six groups of eight lines each. Hence, three bits are required to identify any of the six line groups ($2^3 = 8$). The second field comprises eight bits to convey activity information (1 or 0) for all eight lines in the identified line group. Each bit represents the on-/off-hook status for one line in the identified line group. A "1" indicates off-hook and a "0" indicates on-hook. Words two and three are repeats of word one to guard against errors in transmission. If the COT concentrator 110 receives two out of the three words which match, it assumes that the message has been correctly received.

Message II represents an activity update message. Activity update messages are transmitted in response to activity update request messages from the COT concentrator 110, shown in FIG. 2, Message V, to insure that COT 110 has registered the correct activity information. Activity update messages comprise three words, each eleven bits long. The first word is the header A. The third word comprises two fields. Field one contains three bits and represents the line group identification as was described in connection with Message I. Field two contains eight bits and represents the activity of the eight lines in the line group identified in field one. The second word is the complement of the information contained in the third word.

Message III is a data message for transmission of the "no alarm" condition, sent periodically by RT 112 to COT 110. The first word represents a no alarm code E which is repeated in the second and third words. The periodic transmission of the no-alarm code provides fail-safe alarm information from the RT 102 to COT 100.

Message IV represents the data message for the data link looping test described earlier in connection with FIG. 2, Message IV. The looping test message comprises three words. The first word is the header A. The second word is a compliment of the request code B and word three is the request code B (See Message IV in FIG. 2).

Message V represents an assignment update request data message. The assignment update request is transmitted from the RT concentrator 112 whenever the memory is initialized (as when there is a momentary loss of power) or whenever the assignment information is determined to be outdated. This message is required only for applications where the central office switch (not shown) is digital and can itself perform COT concentrator 110 functions. As mentioned in connection with Message III of FIG. 2, COT concentrator 110 periodically transmits assignment update information to the RT concentrator 112 without the need for assignment update requests. Consequently, when the central office switch is an analog machine, the assignment update requests from RT concentrator 112 are ignored. Assignment update request messages comprise three words, each eleven bits long. A request code C is transmitted as the first word. The second and the third words repeat the information contained in the first word.

Message VI represents an idle code data message comprising eleven bits. The idle code D is transmitted whenever none of the previous messages is needed.

DATA LINK DERVIATION

Referring temporarily to FIG. 4, there are shown timing diagrams that illustrate how the data link message channel is derived. Timing diagram I shows a PCM word comprising eight bits. As mentioned earlier in connection with FIG. 1, information signals on lines 1, 2–48 are sampled by the first group 126 of channel units and the second group 128 of channel units to produce PAM samples. These PAM samples are then encoded by the TRU's 114 and 116 to produce eight-bit PCM words. In every sixth frame, the eighth bit is used for transmitting per line signaling information. The signaling information transmitted relates, for example, to ringing signals to be applied to subscriber lines.

Timing diagram II represents one frame of information transmitted in 125 microseconds. One frame comprises twenty-four eight-bit PCM words ($24 \times 8 = 192$ bits) and one framing bit in the 193rd bit position. Each PCM word has a format shown in diagram I. Every sixth frame, the eighth bit in all twenty-four PCM words is used for transmitting per channel signaling information, one bit for each of the twenty-four channels.

Diagram III shows seventy-two consecutively numbered frame, ($72 \times \frac{1}{8} = 9$ ms) each frame having a format as shown in diagram II. In diagram IV there is shown the terminal framing bit pattern $F_T$ appearing in the 193rd bit positions in odd numbered frames. The terminal framing bit pattern comprises an alternating sequence of "1's" and "0's" and permits overall framing at the receiving terminal.

Diagram V represents the supervisory framing bit pattern $F_S$ appearing in the 193rd bit positions of even numbered frames. The pattern comprises three consecutive zeros followed by three consecutive ones. The change from zeros to ones and the change from ones to zeros in the supervisory framing bit pattern mark every sixth frame for recovering the per line signaling information contained in the eighth bit position of the PCM words therein. Out of seventy-two consecutive frames, only twelve of the thirty-six supervisory framing bit positions are needed for framing. The remaining twenty-four bit positions may therefore be used for other than framing information. Use is made of some of these bit positions to derive a data link for transmission of the data messages of FIGS. 2 and 3 between COT 100 and RT 102. Eleven of the twenty-four unused supervisory framing bit positions constitute a 1,222 bps data link (($11$ bits$\div 9$ ms)$\times 1000$ ms/sec$=1,222$ bits/sec) for transmitting data messages relating to the concentrator functions. These data messages were described in detail in connection with FIGS. 2 and 3. In the U.S. patent application of Mr. J. E. Landry, Ser. No. 966,637, filed Dec. 5, 1978, and assigned to applicant's assignee, the derived data link is described in more detail.

CONCENTRATOR SYSTEM (CONTINUED)

Referring back to FIG. 1, there is shown a lead 127 for transmitting data messages originating at microcomputer 124, passed via bus 121 to TSI 120 and, one eleven bit data word at a time, from transmit TSI 120 to data link unit (DLU) 118. The eleven bits in DLU 118, are transmitted, one bit at a time, over lead 129 to the master TRU 114 for insertion in the appropriate 193rd bit positions constituting the data link on the pulse stream on lead 113. The slave TRU 116 inserts normal framing bit patterns in the 193rd bit positions of the pulse stream on lead 115. Synchronizing signals are transmitted from the master TRU 114 to the receive TSI 122, as will be described later. It is for these reasons that the master TRU 114 is called the master unit.

The PCM streams from TRU's 114 and 116 are transmitted over leads 113 and 115, respectively, to transmit TSI 120 where up to twenty-four PCM samples may be selectively multiplexed for transmission over lead 123, thereby achieving the concentrator function at the COT concentrator 110. At transmit TSI 120, the framing bits from the master PCM stream from master TRU 114 are inserted in the 193rd bit positions of the concentrated PCM bit stream, while the framing bits from the slave TRU 116 are discarded.

To minimize errors in transmission, the outgoing unipolar PCM bit stream on lead 123 is converted to a bipolar pulse stream by the line interface unit (LIU) 126. The outgoing bipolar concentrated PCM pulse stream transmitted to RT 102 from LIU 126 is passed through a pulse repeater 104 which is one of a plurality of such repeaters. The incoming bipolar concentrated PCM stream, received from the RT 102 is similarly passed through a pulse repeater 106 which is one of a plurality of such repeaters. The received concentrated bipolar bit stream is then converted from bipolar to unipolar signals at LIU 126. The received concentrated PCM stream is transmitted from LIU 126 to the receive TSI 122 over lead 125. The LIU 126 also generates a 6.176 MHz transmit clock signal for the transmit TSI 120, and the transmit portion of master TRU 114, and the transmit portion of the slave TRU 116. From the concentrated PCM stream received from the remote terminal 102, a receive clock signal is extracted at LIU 126 for the receive TSI 122 and the receive portions of the master TRU 114 and slave TRU 116.

The concentrated PCM stream received on lead 125 is selectively stored in the receive TSI 122 and sequentially retrieved to derive two separate multiplexed PCM pulse streams of twenty-four words per frame each, thereby performing the expansion function. The expansion function performed at the receive TSI 122 is the exact opposite of the function performed during the concentration stage at transmit TSI 120. Receive TSI 122 and transmit TSI 120, however, operate independently and asynchronously of each other. The expanded PCM streams are transmitted over leads 117 and 119 to master TRU 114 and slave TRU 116, respectively.

Lead 131, bridged to lead 117, is connected to DLU 118. In order to extract the data link messages from the received PCM stream, timing pulses occurring in the 193rd bit position of the received pulse train from master TRU 114 are transmitted over lead 135 to DLU 118. Data link messages, extracted by using these timing pulses, are transmitted back from DLU 118 to receive TSI 122 over lead 137 in order to take advantage of the interface with microcomputer 124 in receive TSI 122. At the receive TSI 122, the data messages are read by microcomputer 124, decoded and appropriate action taken. A similar function is performed at the RT concentrator 112.

Signaling information, e.g., ringing signals, from the first group 126 of channel units is detected and sequentially and periodically transmitted from each channel unit over a common bus 139 to transmit TSI 120. Similarly, signaling information from each channel unit in the second group 128 is detected and sequentially and periodically transmitted over a common bus 141 to transmit TSI 120. Signaling information thus collected from all forty-eight lines is stored in six activity words of eight bits each in TSI 120. In a signaling activity word, each bit represents the activity of one line. Off-hook information, collected in TSI 164 at RT 102, is also transmitted to COT 100 via the data link and stored as activity words in microcomputer 124.

On command, an activity word is transmitted from the transmit TSI 120 to microcomputer 124 in order to determine if a change in status of the activity for a line has occurred since the last time the activity word was examined. Similarly, activity words from RT 102 stored in the microcomputer memory, RAM 704, is examined. If the status of a line has changed, i.e., if a line is determined to have received a ringing signal or has gone off-hook, thereby requesting service, an idle trunk must be assigned to that line. If a line has gone on-hook, the trunk assigned to that line must be deassigned. Consequently, trunk assignment and deassignment data words (FIG. 2) are assembled in microcomputer 124 for transmission through transmit TSI 120 and the data link to the RT concentrator 112. Activity status for all forty-eight lines are thus maintained at the COT concentrator 110 for both originations at the COT 100 and originations at the RT 102.

In the transmit direction, synchronization is obtained by pulses transmitted from transmit TSI 120 over lead 143 to master TRU 114 and to slave TRU 116 (lead not shown). In the receive direction, TRU's 114 and 116 and receive TSI 122 are synchronized to the concentrated PCM stream received from the RT 102. If framing is lost at the master TRU 114, an out-of-frame (OOF) signal is transmitted over lead 145 to the receive TSI 122; normal processing is inhibited and a special out-of-frame mode of operation is entered until framing is recovered at the master TRU 114. When framing is recovered at the master TRU 114, the out-of-frame signal is removed from lead 145. On recognition of this state at the receive TSI 122, the out-of-frame mode of operation is discontinued and the normal mode of operation is resumed.

Referring to the RT 102 in FIG. 1, subscriber stations 49, 50–72 are connected to a third group 150 of channel units CU1, CU2,–CU24, respectively. Similarly, the subscriber stations 73, 74,–96 are connected to a fourth group 152 of channel units CU25, CU26–CU48. The third group 150 of channel units is connected to a master TRU 154 through leads 151 for bidirectional PAM transmission. Similarly, the fourth group 152 of channel units is connected to a slave TRU 156 through leads 153 for bidirectional PAM transmission.

RT 102 is identical in most respects to the COT 100 and performs the same functions as described earlier in connection with COT 100. However, RT 102 may be distinguished from the COT 100 in the following functions. All information necessary for the assignment of idle trunks to busy lines is stored only at COT concentrator 110. Necessarily then, all assignments are also performed only at COT concentrator 110. After assignment of an idle trunk to a busy line, but before establishing a connection, a PCM looping test is performed to ensure continuity of the path and to verify that all essential components are indeed functional for establishing a connection. This looping test is performed under control of the microcomputer 124 at the COT concentrator 110.

TRANSMIT TSI TIMING

Figure 5:
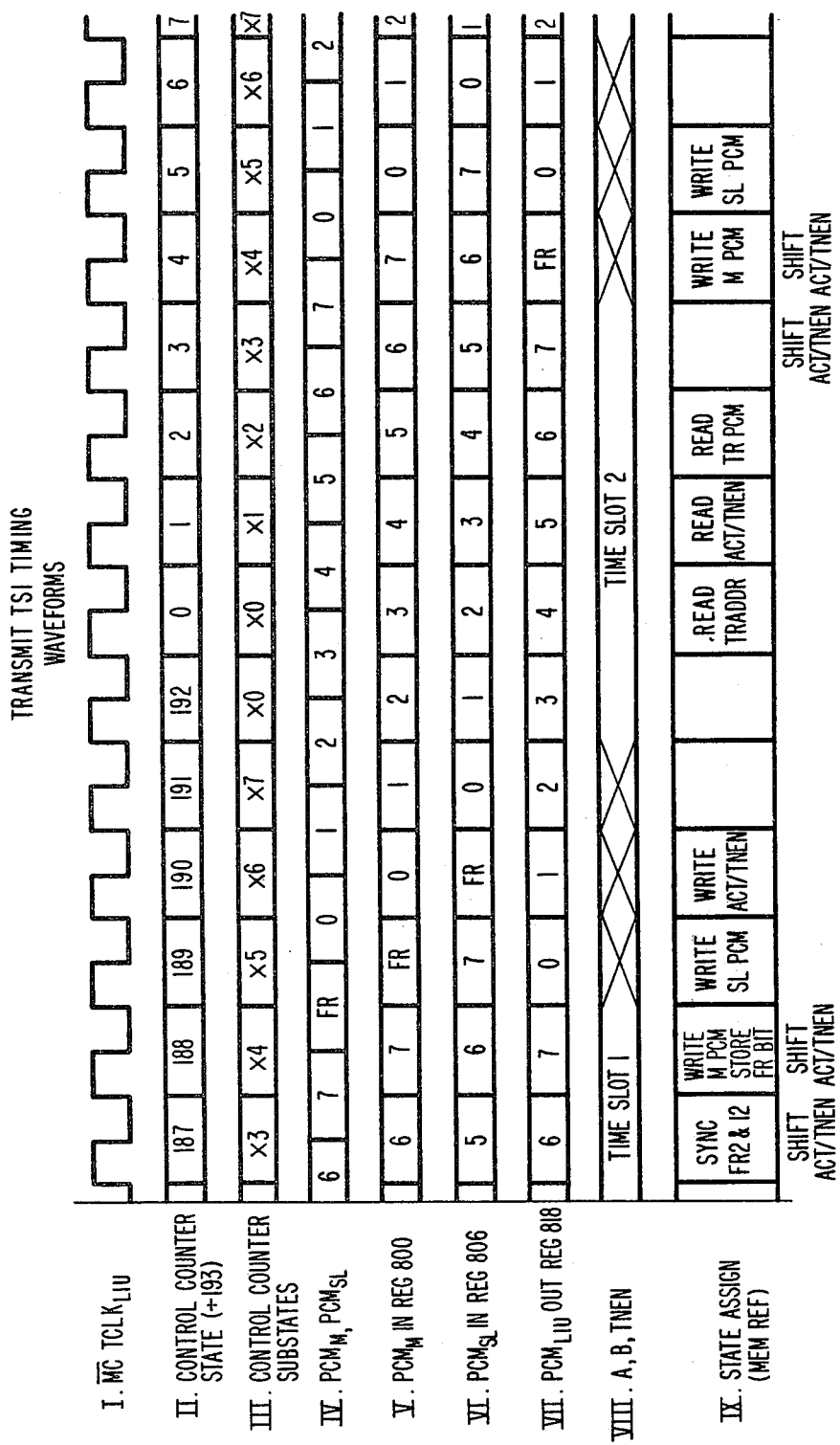
FIG. 5 is a timing diagram for the transmit time slot interchanger of FIG. 1.

Referring to FIG. 5, there are shown timing diagrams associated with the functions performed at the transmit TSI 120. Diagram I is a 1.544 MHz master transmit clock derived from the transmit clock obtained from LIU 126 in FIG. 1. A control counter (discussed later) in the transmit TSI 120 generates frames of 193 clock pulses to correspond with the 193 bit positions in a frame. The states corresponding to each of the clock pulses are numbered consecutively 0, 1, 2,-192 (see diagram II). Each control counter state corresponds to a control period or memory cycle ($1 \div 1,544,000 = 648$ nanoseconds) during which a function must be performed at the TSI's in terminals 100 and 102.

Some functions are performed more often than others. For purposes of understanding, then, the control counter states are divided into groups, words and substates. Control counter states 0, 1, 2–7 are called substates X0, X1, X2,-X7, respectively, and are repeated regularly as shown in diagram III. The eight substates are grouped to form a control counter word (corresponding to a PCM word). Four control counter words W0, W1, W2, and W3 form a control counter group.

Since there are 193 control counter states, there are seven groups G0, G1, G2,-G6. In the first six control counter groups, all four words and all eight bits in each word are legitimate and correspond to the first 192 control counter states ($6 \times 4 \times 8 = 192$). Therefore, in the seventh group, G6, only the first substate, X0, in word W0, is legitimate. All other words and substates in G6 are illegitimate.

For example, control counter state 190 will correspond to group G5, word W3, and substate X6, or G5W3X6. Control counter state 192 will correspond to group G6, word W0 and substate X0 or G6W0X0.

Referring to diagram IV, there are shown the individual bit positions in control counter word format received at transmit TSI 120 in FIG. 1 from master TRU 114 and from slave TRU 116. The multiplexed PCM stream PCM$_M$, from master TRU 114, and the multiplexed PCM stream PCM$_{SL}$, from slave TRU 116, arrive simultaneously at transmit TSI 120 shown in FIG. 1. At transmit TSI 120, the PCM$_M$ stream is clocked with the master clock shown in diagram I to derive the word format shown in diagram V. This word format appears with approximately a one-half memory cycle delay. Similarly, the PCM$_{SL}$ stream is shown in waveform VI. However, as only one operation can be performed during any one memory cycle at the transmit TSI 120, the PCM$_{SL}$ bit stream is delayed by one and one-half memory cycles.

Referring to diagram VII, there are shown the bit positions in the concentrated PCM bit stream, PCM$_{LIU}$, for transmission on lead 123 shown in FIG. 1.

Referring to diagram VIII, there is shown a segment, in block format, of a series of control counter words corresponding to the PAM sampling periods during which supervisory information from channel units in the first group 126 and the second group 128 shown in FIG. 1 is transmitted over common buses 139 and 141 to the transmit TSI 120. Because about four substates in each control counter word are required to permit the information to settle down (shown as Xs in diagram VIII), only during the last four substates of a PCM word is the information made available for use at the transmit TSI 120. Diagram IX shows some of the functions that are performed in the substates and will be described in detail later.

RECEIVE TSI TIMING

Figure 6:
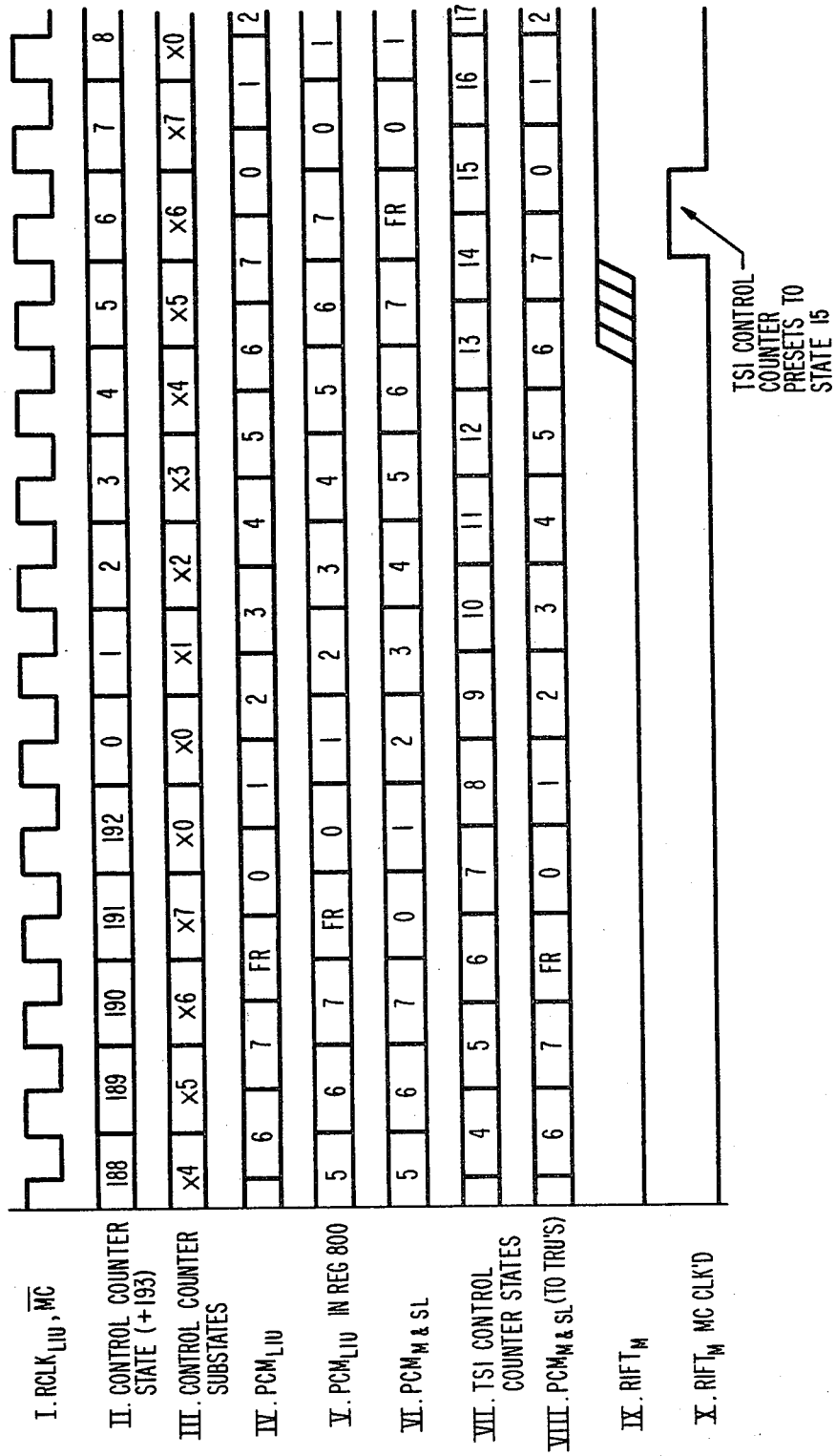
FIG. 6 is a timing diagram for the receive time slot interchanger of FIG. 1.

Referring to FIG. 6, there are shown timing diagrams for receiving TSI 122 shown in FIG. 1. Diagram I is a 1.544 MHz master receive clock received from LIU 126. Diagram II represents control counter states similar to the control counter states in timing diagram II shown in FIG. 5. During each control counter state, a function is performed at the receive TSI 122. The control counter states are grouped into substates, words, and groups in the same manner as was described in connection with FIG. 5.

Diagram III of FIG. 6 shows a segment of the sequence of the control counter substates in a frame. Diagram IV is the sequence of the bit positions in multiplexed PCM words, PCM$_{LIU}$, received on lead 125 from LIU 126. The PCM$_{LIU}$ pulse stream is clocked with the master receive clock shown in Diagram I. This results in a delay and is shown shifted by half a memory cycle in timing diagram V.

Receive TSI 122 expands the received concentrated bit stream PCM$_{LIU}$ into two PCM streams. One PCM stream, PCM$_M$, is transmitted over lead 117 to master TRU 114. The second PCM stream, PCM$_{SL}$, is transmitted over lead 119 to slave TRU 116. Both of the expanded PCM streams, PCM$_M$ and PCM$_{SL}$, are transmitted simultaneously and in synchronism and are shown in diagram VI.

Referring to diagram VII of FIG. 6, there is shown a different segment of the same sequence of the control counter states shown in diagram II. Diagram VIII is the PCM$_M$ and PCM$_{SL}$ bit positions corresponding to the control counter states shown in diagram VII. When master TRU 114 in FIG. 1 loses framing, an out-of-frame signal is transmitted over lead 145 to receive TSI 122. After framing is recovered, the out-of-frame signal present on lead 145 of FIG. 1 is removed. Simultaneously, a clock signal, RIFT$_M$, shown in diagram IX, is transmitted from master TRU 114 to receive TSI 122 (lead not shown). The RIFT$_M$ clock signal is gated with the master clock shown in diagram I to produce a clock pulse one memory cycle wide shown in diagram X as RIFT$_M$, MC clocked. The RIFT$_M$ clock pulse presets the control counter to a preselected state, e.g., to state fifteen.

MICROCOMPUTER

Figure 7:
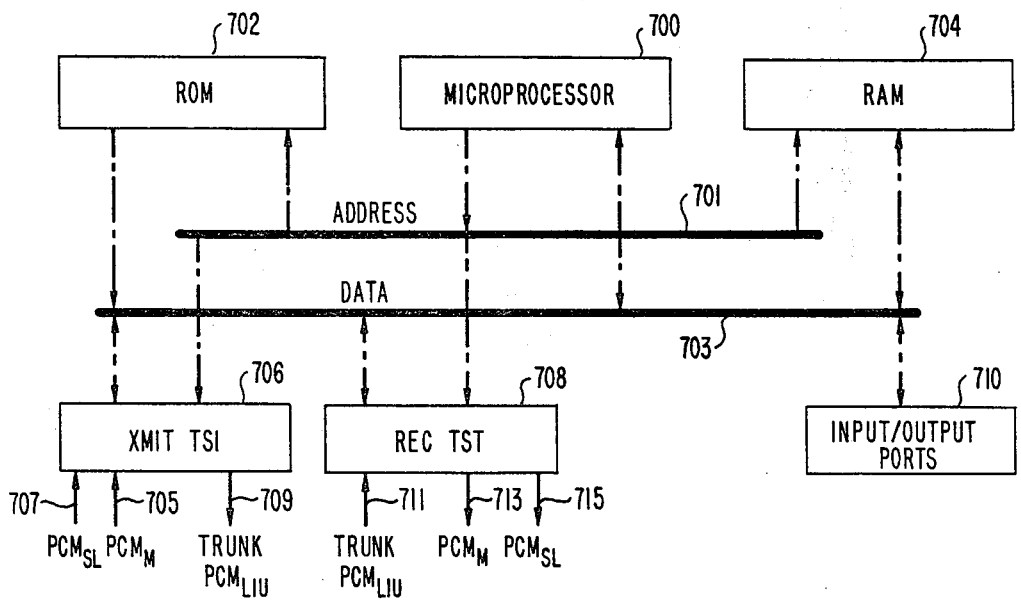
FIG. 7 is a general block diagram showing address and data buses interconnecting the major elements at each terminal of FIG. 1.

Referring to FIG. 7, there is shown in block diagram representation a concentrator terminal for use at either COT 100 or RT 102 in FIG. 1. At the concentrator terminal, a microcomputer (i.e., microcomputer 124 at COT 110 or microcomputer 160 at RT 112 in FIG. 1) comprises a microprocessor 700 connected to a read only memory (ROM) 702, a random access memory (RAM) 704, and input/output ports 710 through a common address bus 701 and a common data bus 703. A master PCM bit stream, $PCM_M$, from master TRU 114 and a slave PCM bit stream, $PCM_{SL}$, from slave TRU 116 in FIG. 1 are transmitted over leads 705 and 707, respectively, to transmit TSI 706 (TSI 120 at COT 100 or TSI 164 at RT 102). Under direction of the microprocessor 700, up to twenty-four PCM words from the $PCM_M$ and the $PCM_{SL}$ bit streams are selectively retrieved from transmit TSI 706 and multiplexed to derive a concentrated PCM bit stream $PCM_{LIU}$ for transmission over lead 709 (i.e., lead 123 in FIG. 1) to RT 102 shown in FIG. 1.

The concentrated PCM stream, $PCM_{LIU}$, received from RT concentrator 112, shown in FIG. 1, is transmitted over lead 711 to a receive TSI 708 for expansion of the received concentrated PCM stream. The two expanded PCM bit streams, $PCM_M$ and $PCM_{SL}$, are transmitted over leads 713 and 715, respectively, to master TRU 114 and slave TRU 116 of FIG. 1. Communication between equipment other than the TSIs 706 and 708 and microprocessor 700 takes place through ports 710. Input commands may be manual switch positions, while output signals may include control signals providing a display of traffic conditions, transfer of the traffic conditions to central office equipment, alarm outputs, all-trunks-busy outputs, and the like.

TIME SLOT INTERCHANGER

Entry of PCM Words From Lines

Figure 8:
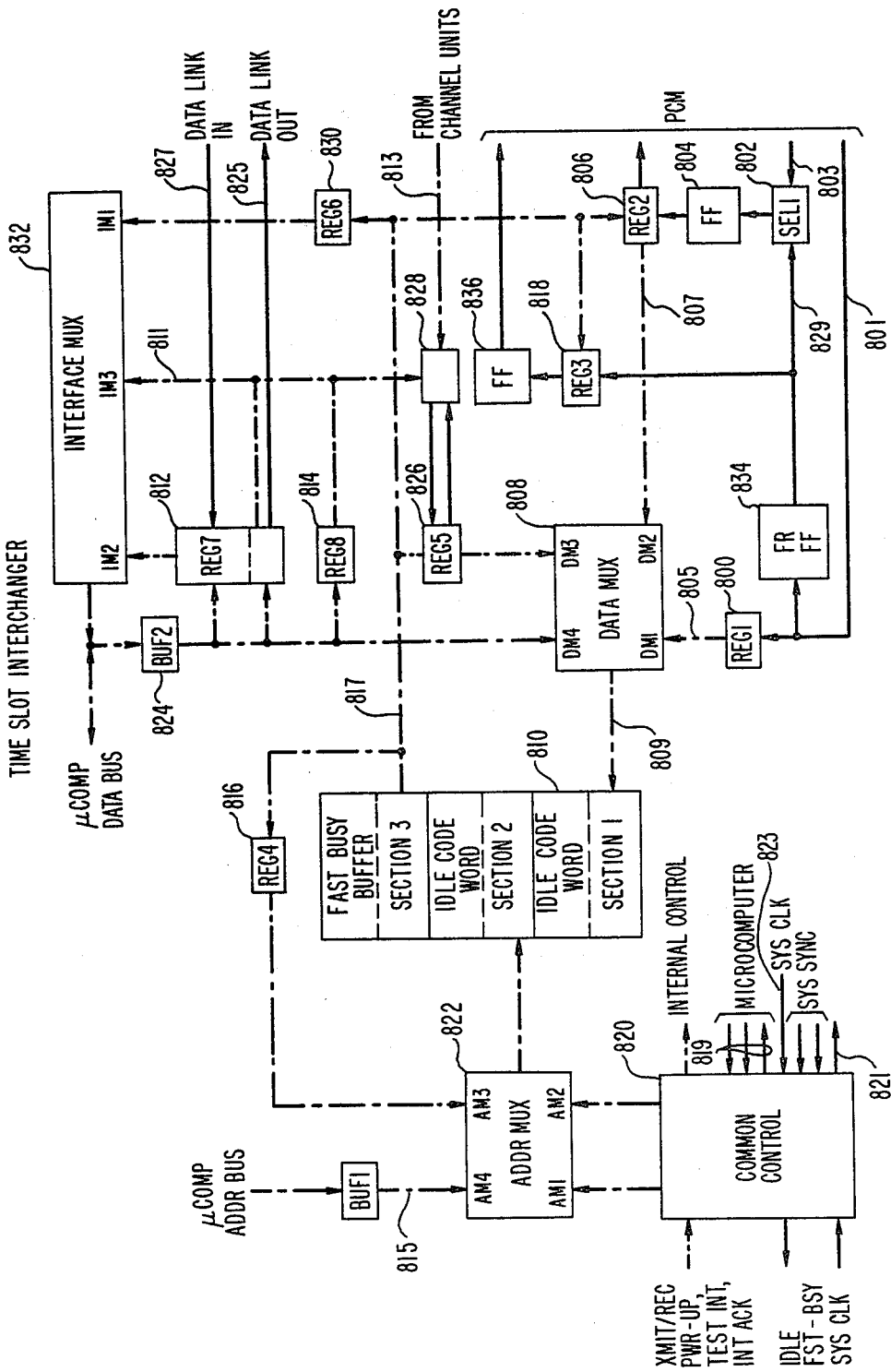
FIG. 8 is a block diagram of the time slot interchangers of FIG. 7.

Referring to FIG. 8, there is shown a more detailed block diagram of a time slot interchanger which may be used either for transmission or for reception (shown in FIG. 1 at COT 100 as transmit TSI 120 and receive TSI 122 and at RT 102 as transmit TSI 164 and receive TSI 162). When operating in the transmit mode, such as TSI 120 or TSI 164, the master PCM stream on lead 801 from the master TRU 114 or 154 is entered into a serial-to-parallel register 800 for parallel transmission of eight-bit PCM words over leads 805. Similarly, the slave PCM stream on lead 803 from the slave TRU 116 or 156 is entered, after a one memory cycle delay in flip-flop 804, into a serial-to-parallel register 806 for parallel transmission of PCM words over leads 807. Because the PCM streams from the TRU's arrive simultaneously at the TSI, the entry of the slave PCM bit stream into register 806 is delayed by one control counter state by introducing flip-flop 804 in its path. This one bit delay insures substate alignment during alternate entry of PCM words from registers 800 and 806 through a data multiplexer 808 and via bus 809 into a random access memory (RAM) 810.

The RAM 810 is divided into three sections. Section 1 comprises forty-nine bytes of storage space, forty-eight bytes of which are used for storage of PCM words to be transmitted in odd numbered output frames and the 49th byte of which is used for storage of a PCM idle code word.

Section 2 of RAM 810 also comprises forty-nine bytes of storage space, forty-eight bytes of which are used for storage of PCM words to be transmitted in even numbered output frames, and the 49th byte of which is used for storage of an idle code word.

Section 3 likewise comprises forty-nine bytes of storage space, the use of which differs depending upon whether the TSI is used as a transmitter or a receiver, as will be described below.

TSI SECTION 3 STORAGE MAP

Referring to FIG. 9, there is shown a storage map for section 3 of transmit TSI RAM 810 for use as transmit TSI 120 at COT 100 or transmit TSI 164 at RT 102. A group 901 of twenty-four bytes of storage space hold the assignments for concentrator trunks 1 through 24. That is, the storage of a particular line code in the storage byte set aside for a particular trunk constitutes the assignment of that line to that trunk. Each concentrator trunk assignment word comprises eight bits: six bits identify the line that is assigned to the trunk ($2^6=64$), the other two bits of storage space are used to store enable bits (X and Y) relating to the PCM looping test, as will be described below.

The enable bits X disable any one of the twenty-four lines connected to either master TRU 114 or master TRU 154. Likewise, the enable bits Y disable any one of the twenty-four lines connected to either slave TRU 116 or slave TRU 156. Each of the forty-eight enable bits therefore disables a designated one of the forty-eight input lines ($2 \times 24 = 48$) according to a predetermined pattern.

In the transmit mode of operation, at both TSI 120 and TSI 164 the enable bits X and Y inhibit the writing of PCM words from the lines (i.e., registers 800 and 806) to TSI RAM 810. Instead of writing the PCM words from registers 800 and 806 into the TSI RAM 810, a PCM looping test code word from microcomputer 124 or 160 is written into RAM 810 in the place of the PCM word from register 800 or 806.

In the receive mode of operation, at both TSI 122 and TSI 162 the enable bits disable lines to prevent transmission of the PCM looping test code word from a concentrator trunk to the line during the PCM looping test. This is achieved by preventing the transfer of PCM words fromm the TSI RAM 810 to registers 818 and 806, as will be discussed in detail later. Instead, an idle PCM word (all zeroes) generated by each of registers 818 and 806 is transmitted to the lines during the PCM looping test. The use of these enable bits permits access to Sections 1 and 2 of TSI RAM 810 by microcomputers 124 and 160 by disabling the transfer of PCM words from or to the lines.

A second group 902 of six storage bytes (FIG. 9) are used for storing activity words 1 through 6. At COT 100, activity words comprise eight bits each, four of which contain COT-to-RT signaling information relating to four lines from master line group 126, whereas the other four contain signaling information relating to four lines from the slave line group 128. Similarly, at the RT 102, the activity words contain RT-to-COT signaling information, e.g., the on-/off-hook status of the lines.

A third group 903 of six storage bytes are used for storage of class of service information (also called "transmit not enable"—TNEN) words. Each TNEN word comprises eight bits. The bits, taken two at a time, define the class of service for two lines and will be described in detail below.

FIG. 10 is a storage map for section 3 of RAM 810, used in receive TSI 122 or receive TSI 162 of FIG. 1. A group 1001 of twenty-four bytes of storage space are used for storing line assignments for concentrator trunks 1 through 24. The format is identical to that disclosed in connection with FIG. 9. The enable bits, X and Y, prevent the transmission of PCM words to lines during the PCM looping test, but enable the transmission of an idle code PCM word during this test.

A second group 1002 of twenty-four bytes of storage space are used for recording line assignments to "busy trunks" 1 through 24. When all twenty-four concentrator trunks are in use, a busy trunk is assigned to each newly active line for informing a customer of this no-trunk-available condition. A fast-busy word is entered in the 49th storage byte 1003 in every frame by microcomputer 124 for transmission to each newly active line when all concentrator trunks are busy. A "busy trunk" is thus not a trunk at all, but merely an assignment of a line to the fast-busy state, during which the fast busy byte 1003 is read out onto the identified lines. This arrangement permits busy signaling for up to twenty-four lines, should all of the other twenty-four lines be simultaneously assigned to the twenty-four available trunks. At the receive TSI 162 in RT 102, the fast-busy codes are not used, thus encouraging subscribers to stay off-hook until a trunk becomes idle.

Microcomputer Storage Map

Figure 11:
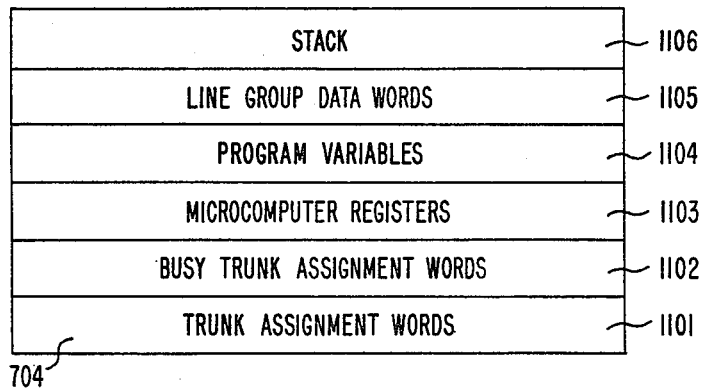
FIG. 11 is a data storage map for the random access memory of the microcomputer of FIG. 7.

Referring to FIG. 11, there is shown a data storage map for microcomputer RAM 704 in FIG. 7. A group 1101 of twenty-four storage bytes are used for storing the active trunk assignment words and another group 1102 of twenty-four storage bytes are used for storing busy trunk assignment words as described in connection with FIG. 10. A third section 1103 of microcomputer RAM 704 comprises a plurality of bytes of storage space for use as microcomputer registers. These registers perform functions such as temporary storage of fast-busy words for transfer to TSI RAM 810, for pointers to busy words, for polling timers to detect data message words, and the like.

A separate section 1104 of storage bytes comprises program variables for operating microprocessor 700 of FIG. 7. Yet another section 1105 of microcomputer RAM 704 comprises line group data words. Line group data words comprise information relating to lines such as class of service, activity status, line-trunk assignment status, and busy-trunk assignment status. A final section 1106 of microcomputer RAM 704 is used for storing a subroutine and interrupt return stack of addresses.

Referring back to FIG. 1, an information bit representing the class of service (TNEN) is transmitted from each of the channel units in group 126 over the common bus 139 to transmit TSI 120. Similarly, the class of service bit from each of the channel units in group 128 is transmitted over common bus 141 to transmit TSI 120. The TNEN words comprising eight bits each are then stored as described earlier in the memory represented in FIG. 9. The class of service is identified by grouping two consecutive TNEN bits at a time. Table 1 shows how these groups are decoded:

TABLE 1

| TNEN Bit 1 | TNEN Bit 2 | CLASS OF SERVICE |
|---|---|---|
| 0 | 0 | Voice grade service |
| 0 | 1 | Voice grade special service |
| 1 | 0 | Data grade special service |
| 1 | 1 | Open (no channel unit used) |

A zero bit from CU1, for example, and a zero bit from CU2, taken together, form a code "00" which is decoded as indicating voice grade service on lines terminating on both channel units. A "01" code indicates a single voice grade special (e.g., program) service channel unit assigned to line positions 1 and 2. A "10" code indicates a single data special service channel unit assigned to the two line positions. A "11" code indicates that neither of the two channel units is in service. In the preferred embodiment of the invention, two channel units are located on one circuit board and form a single plug-in unit and thus the channel units can be considered two-at-a-time.

Each special service channel unit, however, is located on one circuit board and occupies the same physical space as a dual voice grade channel plug-in unit. Each special service channel unit provides class of service information bits on both TNEN leads, thereby appearing at transmit TSI 120 as if two channel units were in service. Whenever special service channel units are in use, microcomputer 124 must continously assign a concentrator trunk to each special service channel to provide uninterrupted service to the lines terminated on these special service channel units and deny service to the unused line in the pair.

In order to decode the class of service information and identify the special service channel units, the class of service words stored in RAM 810 and associated with either transmit TSI 120 or with transmit TSI 164 of FIG. 1 are transmitted to microprocessor 700 for storage in microcomputer RAM 704 at storage locations 1105 (FIG. 11).

Figure 12:
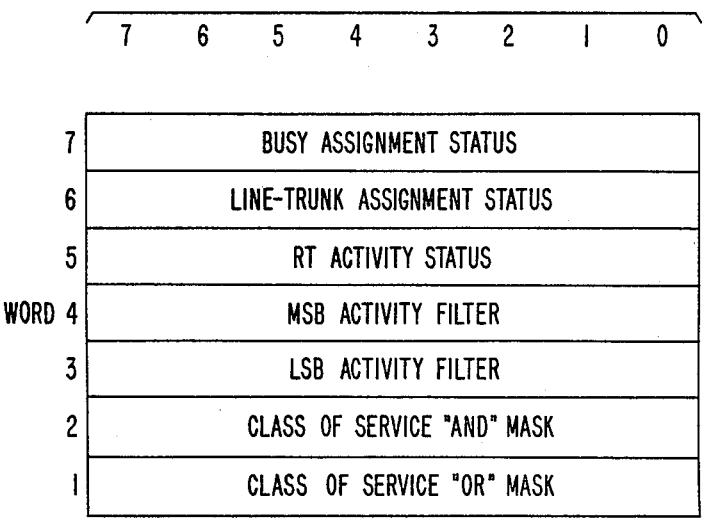
FIG. 12 is a detailed memory map of the line group data words shown in the memory map of FIG. 11.

Referring to FIG. 12, there are shown in detail the line group data words 1105 stored in RAM 704 as shown in FIG. 11. There are six line groups of seven data words each. Only one such group is shown in FIG. 12. Each word in FIG. 12 has eight bits numbered 0-7. The seven words in a line group comprise various data for the group of eight lines. Data bits for a particular line are stored as information bits in a column in each of the seven words. The columns are shown numbered from right to left as 0, 1, 2, 3-7. Each of the eight columns comprises data for a different line in the same group.

Referring back to FIG. 9, the class of service words 903 shown there are transmitted to microcomputer 124 or 160 of FIG. 1. At the microcomputer 124, the class of service words are decoded according to Table 1. In order to provide continuous service, deny service, or provide service on demand, each activity word in section 3 of TSI RAM 810 of FIG. 8 must be accessed, processed and acted upon. This processing is achieved by the use of two masks: an OR mask and an AND mask created by the microcomputer 124 from the class of service words.

Returning to FIG. 12, the OR mask and AND mask are shown as eight bit words 1 and 2, respectively. A one in the OR mask, when combined with a zero in the activity word, forces a one output (creates activity). A zero in the AND mask, when combined with a one in the activity word, prevents a one output (destroys activity). The masks operate as follows.

Once every nine milliseconds, each of the six new activity words, shown in FIG. 9, are processed with the OR mask and the AND mask, successively. For example, if the OR mask is 01000000 and one of the new activity words is "10001110," after ORing these two words, the resulting word is "11001110." This resulting word indicates that in column 6, although the new activity bit is a "0", the corresponding OR bit is a "1" thereby forcing service to be provided. For this reason, the OR mask can be considered as a means of creating or providing continuous service for each line having a "1" in the associated column (corresponding to special service channel units).

The AND mask is then ANDed with the resulting OR mask processed activity word. For example, if the AND mask is "11110111" and the OR mask processed activity word is "11001110", the AND masked activity word is "11000110." Both bits in the AND word and in the OR masked activity word must be "1's" in the same column, for the bit "1" to remain after AND masking. The AND mask can thus be considered as a means of denying service for each line having a "0" in the associated column (corresponding to out of service channel units).

Comparing the original activity word "10001110" and the masked activity word, i.e., the activity word after processing with the OR and AND masks, "11000110", it can be seen that, as a result of masking, the line corresponding to column 3 is denied service while the line corresponding to column 6 is provided service.

Word 3 and word 4 of the data words of FIG. 12 together operate as an activity filter. In any column, the bit in word 3 is the least significant bit and the bit in word 4 is the most significant bit, of a two-bit up/down counter for determining the activity status of a line. For example, if word 4 is "00001011," word 3 is "00001100" and the new activity word is "10001110," the up counter operates as follows. Each bit from the new activity word is summed with the corresponding bit in the least significant bit word, that is, word 3. The sum is entered in the corresponding column of word 3 and the carry, if any, is summed with the corresponding bit in word 4. This sum is entered in the corresponding bit position of word 4. If, however, the counter is at its maximum state, that is, a count of three, this count of three is retained.

For example, referring to column 2 of the activity words mentioned above, there is found the bit "0" in word 4 and the bit "1" in word 3. The corresponding bit in the new activity word is a "1". The bit "1" from the new activity word is summed with the bit "1" from word 3 to produce a sum of "0" and a bit "1" which is carried over. The bit "0" is entered into the corresponding position in word 3. The carried over bit "1" is summed with the bit "0" in word 4 to yield a sum of "1" which is entered in column 2 of word 4.

Words 3 and 4 are referred to as an activity filter because activity bits must persist for several counts (i.e., after filtering) to indicate a request for service. The activity of every line is processed at least once every seventy-two frames ($72 \times \frac{1}{8} = 9$ ms). A "1" activity bit increases the activity count while a "0" activity bit maintains the same activity count.

To avoid assigning concentrator trunks to lines having spurious activity signals, it is necessary that the up/down counter register a reading of "10" (two) or "11" (three) before the activity is acted upon to assign a trunk. Stated differently, a demand for service must persist for a period of at least eighteen milliseconds. When service is discontinued, again to insure against spurious loss of activity signals, the up/down counter is decremented once every three seconds. If the counter had registered "11" and a spurious signal caused a decrementing of the up/down counter to read "10", the status update of the line, performed once every nine milliseconds, causes the up/down counter to be incremented, thereby restoring the original "11" count.

On the other hand, if the decrement was due to a legitimate discontinuity in service, three seconds later the counter would be decremented to register "01". Finally, after three additional seconds, the counter would decrement to a "00" reading. Thus, after six to nine seconds, a count of "00" will be recorded and deassignment is then allowed. This timeout interval is made sufficiently lengthy to bridge over the silent intervals of ringing and the on-hook interval of dial pulsing to prevent reassignment of trunks.

Referring again to FIG. 12, there is shown in word 5 the activity status for eight lines at RT 102 of FIG. 1. Recalling that all assignment of concentrator trunks to lines, whether activity originates at the RT 102 or COT 100, are made at the COT concentrator 110, it is therefore necessary to record the processed activity of all RT lines at COT 110 to permit assignment of concentrator trunks by microcomputer 124.

Referring again to FIG. 12, there is shown in word 6 the line-trunk assignment status for the group of eight lines. A "1" in a column indicates that a trunk has been assigned to that line. Use of the line trunk assignment status word for the eight lines avoids the necessity of immediately searching the trunk assignment words in the RAM data storage 704 by microprocessor 700 in FIG. 7 for each activity scan. The trunk assignment words, however, are searched at a slower rate for sanity purposes. Similarly, word 7 stores busy-trunk assignment status for the same group of eight lines, thereby eliminating the need to search the busy trunk assignment words stored in the microcomputer RAM 704 in FIG. 7. Words 6 and 7, therefore, enable fast response time by the microprocessor 700 in FIG. 7.

TSI Random Access Memory Operation

Figure 13:
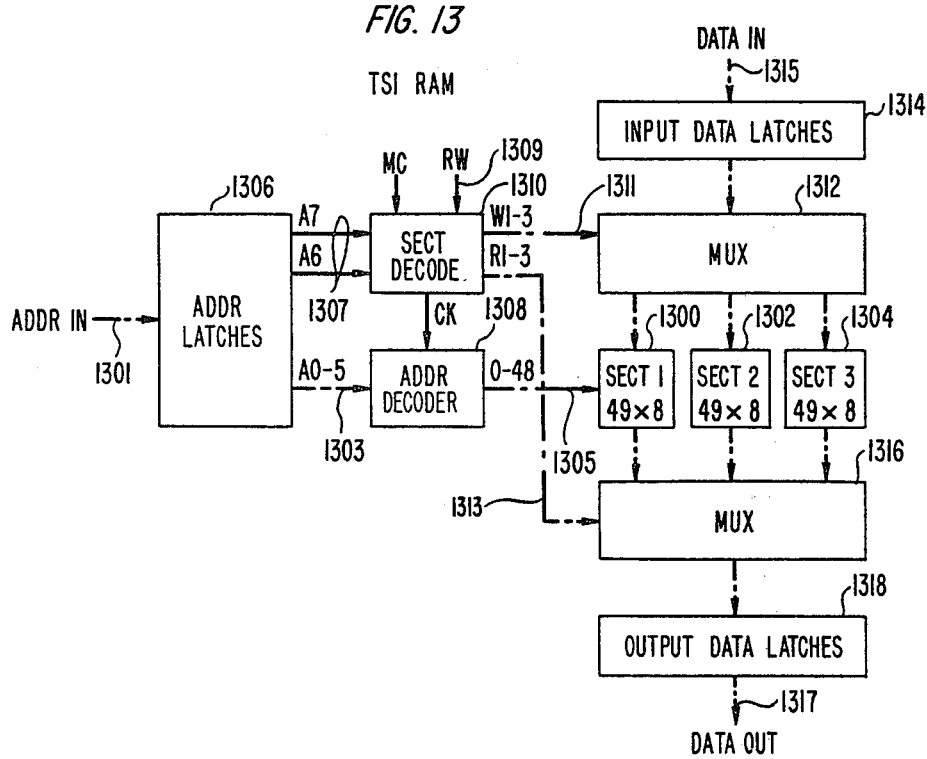
FIG. 13 is a block diagram of the time slot interchanger random access memory.

Referring to FIG. 13, there are shown details of a TSI RAM 810 of FIG. 8. RAM 810 comprises three sections: 1300, 1302, and 1304. Section 1300 comprises forty-nine bytes of storage space, forty-eight bytes of which are for storage of PCM samples from odd-numbered frames, and the 49th byte of which is for storage of an idle code word. The idle code word is used for transmission over a concentrator trunk during the idle state.

Like section 1300, section 1302 also comprises forty-nine bytes of storage space: forty-eight bytes of which are RAM space for storage of PCM words from even-numbered frames and the 49th byte of which is for storage of an idle code word for transmission over concentrator trunks during the idle state.

Section 1304 also comprises forty-nine bytes of storage space, all of which are RAM space. As described in connection with FIGS. 9 and 10, section 1304 is used for storage of trunk assignments, activity words and class of service words in the transmit TSI 120 and for storage of trunk assignments, busy-trunk assignments and a fast-busy word in the receive TSI 122, respectively.

Address bus 1301 from address multiplexer 822 of FIG. 8 terminates on address latches 1306 for storage of address information. Least significant address leads 1303 from address latches 1306 terminate on an address decoder 1308 for decoding the word to be addressed. Leads 1305, from address decoder 1308, terminate on all three sections 1300, 1302 and 1304, and enable the addressed word in any of these sections to be read. Most significant address leads 1307 from the address latches 1306 terminate on section decoder 1310. The possible permutations of the signals on leads 1307 will produce four codes. Three codes are used for addressing one of the three sections 1300, 1302 or 1304. The fourth code is used to address the data link register 812, the supervision control register 814, or leads 811 in FIG. 8.

Control signals from microcomputer 124 or 160 of FIG. 1, appearing on lead 1309, are interpreted as a write operation (logical "0") or a read operation (logical "1"). Control signals on lead 1309, along with the address signals on leads 1307, are decoded at section decoder 1310 for determining whether lead 1311 or 1313 should be enabled. If the signal from microcomputer 124 or 160 directs a write operation, input multiplexer 1312 will be enabled via leads 1311, thus permitting the data on bus 1315, registered in input data latches 1314, to be transmitted through multiplexer 1312 for entry into a storage word. The particular storage word is addressed by leads 1305.

If the signal on lead 1309 directs a read operation, leads 1313 enable the output multiplexer 1316 for transmission of the word addressed by leads 1305 through multiplexer 1316 to output data latches 1318 and thus made available on data bus 1317 (data bus 817 in FIG. 8).

A memory cycle for TSI RAM 810 (FIG. 8) corresponds to the period of the master clock, 1.544 MHz (1 ÷ 1,544,000 = 648 nanoseconds). During the first half of each memory cycle, the input data to latches 1314, the address to latches 1306 and the read/write signal on lead 1309 are allowed to settle. At the start of the second half of a memory cycle, the information is latched and a write or a read operation is initiated. For a write operation, the write function will be completed during this second half of the memory cycle. In a read operation, however, a peculiarity of the memory is that the data word read does not appear on output bus 1317 until the next memory cycle. To complete a read operation, therefore, two memory cycles are required. During the second memory cycle of a read operation, however, while the data read appears on the output bus 1317, another word may be either read from or written into TSI RAM 810 of FIG. 8, thus permitting overlapped memory operations.

Common Control Circuit

Referring again to FIG. 8, there is shown a common control circuit 820 for receiving control signals from microcomputer 700 (shown in FIG. 7) in order to control the internal operation of the various elements in the TSI shown in FIG. 8.

Figure 14:
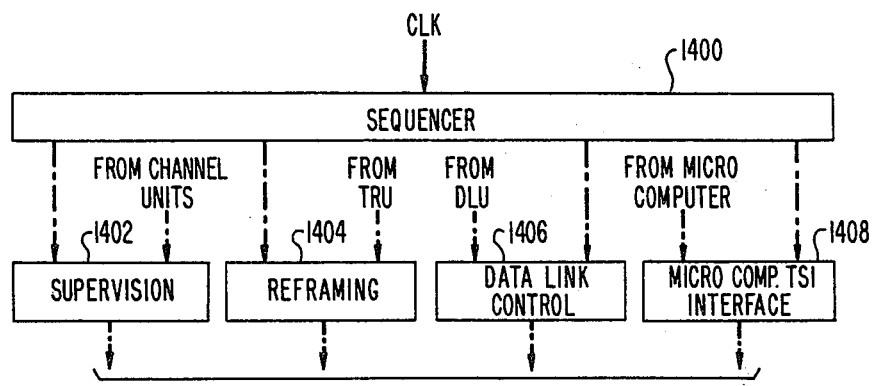
FIG. 14 is a block diagram of the common control of the time slot interchanger of FIG. 8.

Referring to FIG. 14, there is shown a block diagram of the common control circuit 820 of FIG. 8. A sequencer 1400, under control of the master clock, (1.544 MHz), generates control counter output codes referred to as states in connection with FIGS. 5 and 6. The control counter states are decoded for enabling supervision circuit 1402, reframing circuit 1404, data link control circuit 1406, microcomputer-TSI interface circuit 1408, and the various multiplexers, registers and flip-flops of FIG. 8.

Sequencer

Figure 15:
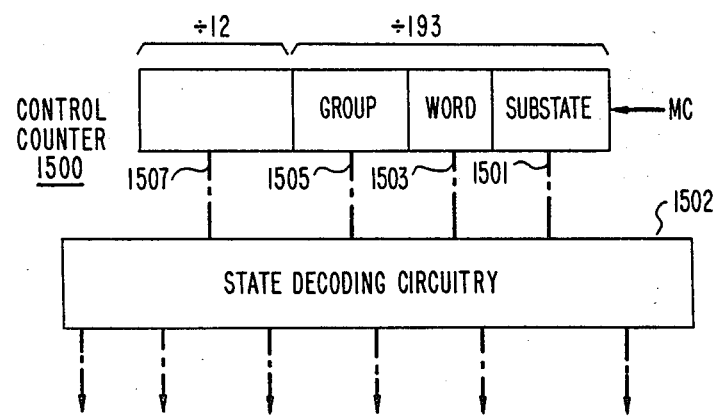
FIG. 15 is a more detailed block diagram of the sequencer shown in the common control of FIG. 14.

Sequencer 1400, shown in greater detail in FIG. 15, comprises a twelve-frame control counter 1500 for generating control counter output codes. Control counter output codes are transmitted over leads 1501, 1503, 1505 and 1507 to state decoding circuitry 1502 for decoding. The least significant control counter bits on the three leads 1501 may be permuted to produce eight different codes. These codes are referred to in FIGS. 5 and 6 as control counter substates, X0,X1,X2–X7. Eight such substates comprise a control counter word. Signals on the two next greater significant leads 1503 may be permuted to produce four different codes. These codes are also called control counter words W0, W1, W2 and W3. Four such control counter words comprise a control counter group.

The signals on the three next greater significant leads 1505 may be permuted to produce eight different codes. These codes are referred to as control counter groups as described in connection with FIGS. 5 and 6. Since there are 193 control counter substates in a frame, the first six control counter groups (G0,G1,G2,–G5), identify the first 192 control counter substates. The 193rd control counter substate is identified as G6W0X0. The other substates and words in group G6 are not used.

Signals on the four most significant control counter output leads 1507 identify the twelve frames. Each control counter state is identified by state decoding circuitry 1502, thereby enabling a lead or a plurality of leads connected to the output of state decoding circuitry 1502 for performing one of a plurality of functions. Such functions might comprise storing a framing bit in a flip-flop, collecting activity or class of service information, receiving PCM streams, transmitting PCM streams, controlling address multiplexers, controlling data multiplexers and the like. The functions to be performed at each substate are further described in Tables 2 and 3.

Referring to Table 2, there are shown the functions to be performed in transmit TSI 120 or transmit TSI 164 of FIG. 1.

TABLE 2

TRANSMIT TSI FUNCTIONS

| CONTROL COUNTER | | | |
|---|---|---|---|
| GROUP | WORD | SUB-STATE | FUNCTIONS PERFORMED |
| G0 to G5 | All | X0 | RAM trunk assignment from TSI RAM 810. |
| G5 | W0 | X0 | Not used |
| G0 to G5 | All | X1 | Write trunk assignments to Feedback Register 816. |
| G0 to G5 | W0 | X1 | Read Activity/TNEN byte from TSI RAM 810. |
| G0 to G5 | All | X2 | Read trunk PCM from TSI RAM 810. |
| G0 to G5 | W0 | X2 | Write activity/TNEN byte to Register 826. |
| G0 to G5 | All | X3 | Write trunk PCM into Register 810. |
| G0 to G5 | All | X3 | Shift master activity/TNEN bit into Register 826. |
| G0 to G5 | All | X3 | Microcomputer can access TSI RAM 810: read or write |
| G5 | W3 | X3 | TRU synchronization pulse to master and slave TRU in frames 2 and 12. |
| G0 to G5 | All | X4 | Write master PCM into RAM 810 from Register 800. |
| G0 to G5 | All | X4 | Shift Slave Activity/TNEN bit into Register 826. |
| G5 | W3 | X4 | Write frame bit into FR FF 834. |
| G0 to G5 | All | X5 | Write Slave PCM into RAM 810 from Register 806. |
| G0 to G5 | W3 | X6 | Write Activity/TNEN byte to RAM 810 from Register 826. |
| G0 to G5 | All | X7 | Microcomputer can access TSI RAM 810: read or write |

Since transmit TSI 120 receives two PCM bit streams (a master PCM stream from master TRU 114 and a slave PCM stream from slave TRU 116), and since each PCM stream comprises twenty-four separate PCM words in every frame, twenty-four master PCM words and twenty-four slave PCM words must be entered into RAM memory 810 of FIG. 8 every frame (125 microseconds). For this task, forty-eight substates are required. In every X4 and X5 substate in words W0, W1, W2 and W3 and in groups G0 through G5 (2×4×6=48), PCM words from the master stream and the slave stream are alternately entered from serial-to-parallel registers 800 and 806, respectively, into RAM 810 of the TSI 120.

Referring more particularly to Table 2, in control counter groups G0 through G5, in all words, W0 through W3, and in every substate X0, a trunk assignment is read from the TSI memory 810. However, this trunk assignment that is read from the TSI memory is not available on the data bus 1317 (bus 817 in FIG. 8) until the next memory cycle i.e., in substate X1. Consequently, during the next memory cycle, namely in substate X1, the trunk assignment word read in substate X0 is available for writing into feedback register 816 of FIG. 8. The trunk assignment word in register 816 is therefore available as an address in the next memory cycle, substate X2, to read out the trunk PCM word. During the next substate, X3, the trunk PCM data is available on bus 817 for output to register 818.

Referring to Table 3, there are shown the functions to be performed in receive TSI 122 or receive TSI 162 of FIG. 1.

TABLE 3

RECEIVE TSI FUNCTIONS

| CONTROL COUNTER | | | |
|---|---|---|---|
| GROUP | WORD | SUB-STATE | FUNCTION PERFORMED |
| G0 | W0 | X0 | Write fast-busy word to Register 826. |
| G0 to G5 | All | X0 | Read busy-trunk assignment from RAM 810. |
| G6 | W0 | X0 | Read fast-busy word from TSI RAM 810. |
| G0 to G5 | All | X1 | Write busy-trunk assignment to Register 816. |
| G0 to G5 | All | X1 | Read trunk assignment from RAM 810. |
| G0 to G5 | All | X2 | Write fast-busy word to TSI RAM 810 from Register 816. |
| G0 to G5 | All | X2 | Write trunk assignment to Register 816. |
| G0 to G5 | All | X3 | Microcomputer can access TSI RAM 810: read or write |
| G0 to G5 | All | X4 | Read Master PCM from TSI RAM 810. |
| G0 to G5 | All | X5 | Write master PCM to Register 818. |
| G0 to G5 | All | X5 | Read Slave PCM from TSI RAM 810. |
| G0 to G5 | All | X6 | Write Slave PCM to Register 806. |
| G0 to G5 | All | X6 | Write trunk PCM to TSI RAM 810 from Regiser 800. |
| G5 | W3 | X6 | Write frame bit to FR FF 834. |
| G0 to G5 | All | X7 | Microcomputer can access TSI RAM 810: read or write. |

LINE STATUS DETECTION

Referring to FIG. 8 there is shown a supervision control register 814 for decoding instructions received from microprocessor 700 of FIG. 7 through buffer 824. Two bits of information are received from microprocessor 700 for entry into register 814. The supervision control modes decoded by register 814 are shown in Table 4.

TABLE 4

| SUPERVISION CONTROL MODES | | |
|---|---|---|
| Bit 1 | Bit 2 | Mode |
| 0 | 0 | Inhibit Read-in (no collection) |
| 0 | 1 | Collect Activity, (e.g., on-/off-hook) Sift for Zeroes, at RT 102. |
| 1 | 0 | Collect TNEN |
| 1 | 1 | Collect Activity, (e.g., ringing) Sift for Ones, at COT 100. |

A "00" code is interpreted so as to inhibit read-in of supervision information from the channel units in groups 126 and 128 of FIG. 1. A "01" code instructs TSI 164 to collect activity by sifting for zeros from channel units in groups 150 and 152. A zero code indicates an off-hook condition and is collected by transmit TSI 164 at RT concentrator 112. A "10" code instructs TSI 120 or TSI 164 to collect class of service information. Finally, a "11" code instructs TSI 120 to collect activity and to sift for ones. Such a code is used by TSI 120 located at COT concentrator 110 to gather activity information.

After decoding in supervision control register 814 occurs, collection of activity or class of service information bits on leads 813 from channel unit groups 126 and 128 is directed by selector 828. The information bits, alternately from master and slave channel unit groups 126 and 128, are collected in register 826, an eight-bit register.

For example, if activity information is to be collected at COT 100, the activity bit from CU1 in group 126 is entered in register 826. Next, the activity bit from CU25 in group 128 is entered. Thus, four bits of activity information from the master and four activity bits from the slave channel units are alternately entered into the eight-bit register 826.

One control counter state is required to enter a bit of activity information into register 826. Since there are forty-eight channel units, forty-eight such activity bits must be entered into register 826, one at a time, in all requiring forty-eight states. However, only eight states are required to completely fill register 826. Once register 826 is filled, its contents are transferred through data multiplexer 808 into the TSI RAM 810 for storage in section 3 as an activity word as described earlier in connection with FIG. 9.

One control counter state is required to write a word from register 826 in TSI RAM 810. Six such states are therefore required to enter all six words of activity information. As shown in Table 2, in every substate X6, word W3 of groups G0 through G5, an activity word is entered from register 826 into RAM 810.

Similarly, eight control counter states are required to fill register 826 with information relating to class of service from the channel units in groups 126 and 128 at COT 100 or groups 150 and 152 at RT 102. Furthermore, six control counter states are required to transfer the six class of service words into storage in RAM 810 or TSI 120 or TSI 164. At any given time, either class of service information or activity information alone is collected.

SUPERVISION COLLECTION CIRCUITRY

Figure 16:
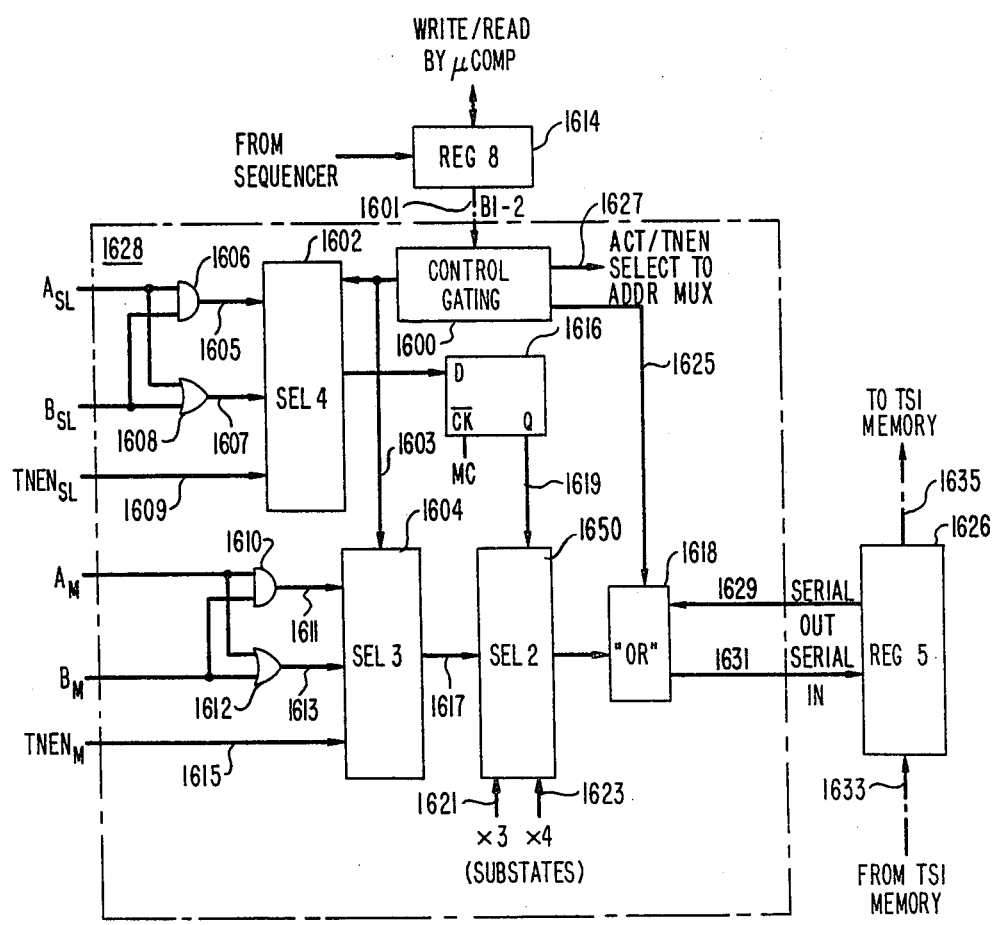
FIG. 16 is a detailed block diagram of the supervision collection circuitry shown in the common control of FIG. 14.

Referring to FIG. 16, there is shown in block diagram form the details of the supervision collection circuitry. Commands from microprocessor 700 of FIG. 7 are entered in supervision control register 1614 (register 814 of FIG. 8). Leads 1601 from register 1614 are terminated at a control gating circuit 1600 for decoding. Leads 1603 from the control gating circuit 1600 terminate at selectors 1602 and 1604 for selectively connecting the selector output leads to input leads 1605, 1607, or 1609 and 1611, 1613, or 1615, respectively, depending on the code, received in register 1614 and interpreted as shown in Table 4.

If the code transmitted from control gating circuit 1600 to the selectors 1602 and 1604 is "01", the selectors 1604 and 1602 enable input leads 1611 and 1605, respectively. Code "01" indicates that zeros must be collected at RT 102. A and B bit signaling information is transmitted on the leads terminating at AND gates 1606 and 1610 for the slave and master bit streams, respectively. If a zero signal is present on either lead terminated at each of the AND gates 1606 and 1610, respectively, a zero signal appears on leads 1605 and 1611. A zero signal on either of leads 1605 or 1611 indicates an off-hook condition at RT 102.

If, on the other hand, the code in register 1614 is "11", selectors 1604 and 1602 are set to enable the signals on leads 1613 and 1607, respectively, at COT 100. A and B bits are collected and sifted at OR gates 1612 and 1608. If a "1" is present on either the A- or B-bit lead, a "1" will be present on leads 1613 or 1607, respectively.

Leads 1617 and 1619 connect selectors 1604 and 1602, respectively, to selector 1650. Referring to Table 2, it will be noted that, in every substrate X3, an activity or a class of service information bit from master group 126 is recorded in register 1626 (Register 826 in FIG. 8) and in every substrate X4, an activity or a class of service information bit from slave group 128 is recorded in register 1626. Consequently, at every substrate X3, lead 1621 enables selector 1650 to transfer the information bit on lead 1617 through the OR gate 1618 and lead 1631 to register 1626. Likewise, in substrate X4, lead 1623 enables selector 1650 to transfer the information bit on lead 1619 through OR gate 1618 to register 1626. Because only one bit of information may be recorded in register 1626 at a time and because the master and slave bits are received simultaneously, the slave information bit from selector 1602 is passed through a flip-flop 1616 to introduce a one cycle delay.

In substrate X1 of word W0, in all six groups G0 through G5, the current activity word is read from TSI RAM 810 of FIG. 8 and entered in register 1626. Each activity bit in register 1626 is serially shifted out on lead 1629 for comparison and updating in OR circuit 1618 with the corresponding bit from either the master group 126 on lead 1617 or the slave group 128 on lead 1619. The updated activity bit is then transmitted back to register 1626 on lead 1631. For example, if activity information is being collected at COT concentrator 110, the collection circuitry would be sifting for "1's". If a "1" bit is shifted out of register 1626 over lead 1629 for comparison in OR circuit 1618 with the latest information bit from selector 1650, and if the latest information bit from register 1614 is a "0", the "1" from lead 1629 is reentered over lead 1631 into register 1626. This ORing function prevents spurious transmission errors from changing the activity status of a line.

Periodically, the read-in of either activity information or class of service information is inhibited as shown in Table 4 by the code "00". When no information is being collected, all the activity words in RAM 810 are initialized. For example, if "1's" are being collected, at transmit TSI 120 the activity words are initialized by entry of all zeros therein. When activity information is collected the next time, register 1626 receives the all zeros code from the initialized activity word in TSI RAM 810. Should a line indicate the ringing condition, namely, if a "1" bit is read, when the "1" bit is compared to the "0" bit in OR circuit 1618, a "1" bit is entered as a legitimate activity bit in register 1650.

If activity bits were being collected at RT 102, zeros would be collected instead of ones. In this case, when microcomputer 160 initializes the activity words in RAM 810, all bits in an activity word would be entered as "1's". In the subsequent collection of activity bits, a one is read out of register 1626 over lead 1629 for comparison at OR circuit 1618 with the latest activity bit. It should be noted that the OR function performed by circuit 1618 is a specialized OR function, depending on whether the TSI is at COT 100 or RT 102. When zeros are collected at RT concentrator 112, if a zero is present either on lead 1629 or transmitted from selector 1650, the zero takes precedence over a one bit and is recorded in register 1626. A lead 1625 from control gating circuit 1600 is used for setting OR circuit 1618 to function for zeros or ones.

If the command from microprocessor 700 of FIG. 7, received by control gating circuit 1600, is "10", it will be decoded as requiring class of service information bits to be collected. Lead 1627 is connected to address multiplexer 822, shown in FIG. 8, for transmission of this code to address the class of service word in TSI RAM 810. The other codes "00", "01" and "11" are also transmitted over lead 1627 to the address multiplexer 822. The code "10" is transmitted from control gating circuit 1600 over leads 1603 to selectors 1604 and 1602 to enable input leads 1615 and 1609, respectively, for collecting class of service information bits from the master and the slave groups of channels 126 and 128, respectively.

Class of service information from the master group 126 of channel units is transmitted on lead 1615, through selector 1604 and lead 1617, to selector 1650. Similarly, the class of service information bits from the slave group 128 of channel units are transmitted on lead 1609 through selector 1602, delay flip-flop 1616 and lead 1619 to selector 1650. Because class of service information bits from master group 126 and slave group 128 are received simultaneously but collected alternately, the class of service information bits from slave group 128 are also delayed one memory cycle by flip-flop 1616.

In substrate X3, a signal on lead 1621 from common control circuit 820 of FIG. 8 enables selector 1614 for transmission of the class of service information bits on lead 1617 to OR gate 1618. In the following substrate, X4, a signal from common control circuit 820 on lead 1623 enables selector 1650 for transmission of the class of service information bits on lead 1619 to OR circuit 1618. Lead 1625 from control gating circuit 1600 sets OR circuit 1618 for collecting class of service information bits.

When OR circuit 1618 is set for class of service operation, information from register 1626 is not transmitted serially over lead 1629, as was done while collecting activity information, because class of service codes, unlike activity words, have no predetermined idle state. On the other hand, activity words in section 3 of TSI RAM 810 of FIG. 8 can be initialized to a preselected state. Any change in state of the activity bits can then be noted by recording a change from a "0" to a "1" or a "1" to a "0". Changes in service occur, for example, when two voice grade telephone service channel units located on a single plug-in, say in group 126, are removed and replaced by a data grade special service plug-in. The class of service information bits then pass from selector 1650 through OR gating circuit 1618 over lead 1631 for entry in register 1626.

Information from TSI RAM 810 of FIG. 8 is received on bus 1633. Information from register 1626 is transmitted on bus 1635 through data multiplexer 808, in FIG. 8, for storage in TSI RAM 810 as either activity words or class of service words in the appropriate storage byte positions in section 3 of the memory.

MICROCOMPUTER—TSI INTERFACE

Referring to FIG. 17, there is shown the detailed microcomputer-TSI interface circuitry 1408 of FIG. 14. FIG. 18 shows the timing waveforms associated with FIG. 17 and the two figures are to be read concurrently. Instructions from microprocessor 700 of FIG. 7 for performance of functions at the TSI in FIG. 8 appear on a select lead 1701, on a read/write lead 1715 and on an address bus comprising four leads 1719. Select lead 1701 is clocked with a master clock at 1.544 MHz, (shown as waveform I in FIG. 18), in a D-type flip-flop 1700, thereby enabling lead 1707 appearing at the Q1 port.

Lead 1707 from the D flip-flop 1700, lead 1703 from the $\overline{Q}_2$ port of D flip-flop 1708 and lead 1705 from the $\overline{Q}_3$ port of D-type flip-flop 1714 terminate on AND gate 1702. Because D flip-flop 1708 and D flip-flop 1714 are normally in the cleared state, their $\overline{Q}$ ports are in the logic "1" state. It is possible that select lead 1701 might be enabled by microprocessor 700 during any substrate. However, as was shown in Tables 2 and 3, the microcomputer instructions are permitted access to TSI RAM 810 only during two substrates, namely X3 and X7, shown as waveforms VI and VII, respectively, in FIG. 18.

Referring to FIG. 18, if the select pulse on select lead 1701 from microprocessor 700 is enabled sometime during substrate X0, shown as waveform III, the select signal would appear as shown in waveform II. The select signal is shown as a plurality of diagonal lines appearing during the substrate X0 to show the uncertainty in arrival time of the select signal. Because the select signal appears during the substrate X0, it is not clocked into D flip-flop 1700 until the beginning of the substrate X1. The output signal on lead 1707 from flip-flop 1700 appears as shown in waveform VIII, remaining until the select instruction appearing on lead 1701 from microprocessor 700 of FIG. 7 is removed.

In substrate X3, lead 1711 (or in substrate X7, lead 1713) will be enabled by a command from sequencer 1400, of FIG. 14, as shown in waveform VI, thereby enabling AND gate 1702 to present an output on lead 1723 as shown in waveform IX. Lead 1723 appears at the input port D2 of flip-flop 1708, at the enable port of selector 1706 and as a command to the address multiplexer 822 of FIG. 8. As described earlier in connection with FIG. 13, a read/write instruction from microprocessor 700 of FIG. 7 appearing on lead 1715 will be a one if the instruction is a read or a zero if the instruction is a write. The read/write instruction appearing on lead 1715 terminates at selector 1706. An internal read/write state decoding signal on lead 1740 from sequencer 1400 also terminates on selector 1706. A signal on lead 1723 enables selector 1706, thereby transmitting a signal to the output lead 1717, shown in FIG. 13 as lead 1309, for enabling RAM 810 of FIG. 8 to perform either a read or a write operation. Such read or write operations are ordered by microprocessor 700 for such words as activity words, class of service words, fast-busy words, line-trunk assignments, line-busy trunk assignments and the like. If the signal on lead 1723 is a one, the read/write command on lead 1715 is transmitted to output lead 1717; if the signal on lead 1723 is a zero, the internal read/write command on lead 1740 is transmitted to output lead 1717.

The output of AND gate 1702 on lead 1723 is also applied to the D port of flip-flop 1708, which is clocked with a master clock, shown in waveform I, to present an output in the following substrate X4, as shown in waveform X, to gating circuit 1710 thereby enabling the addressed one of the output leads 1721. Output leads 1721, in turn, enable interface multiplexer 832 to select register 830, register 814 or register 812, shown in FIG. 8. If the instruction from microprocessor 700 of FIG. 7 appearing on lead 1715 is a read, as noted earlier in connection with FIG. 13, two memory cycles are required for completion. If, during substrate X3, selector 1706 is enabled to perform a read operation, it is not until substrate X4 that the word will appear at output bus 817 of RAM 810 (FIG. 8). Consequently, register 830, connected to RAM 810 and used for storing the word read from RAM 810 for transmission through interface multiplexer 832 to microcomputer 160, must not be enabled sooner than substrate X4. This is achieved by introducing flip-flop 1708 for the purposes of enabling gating circuit 1710 no sooner than substrate X4. Referring to FIG. 18, there is shown in waveform X, pulse Q2 for enabling gating circuit 1710.

Because the word stored in register 830 must be passed through interface multiplexer 832 and then to microprocessor 700, further delay is added to compensate for these circuit propagation delays. This delay is obtained by introducing a flip-flop 1714. The output from the $Q_2$ port of D flip-flop 1708 is passed through OR gate 1712 to the D3 port of flip-flop 1714 where it is synchronized with the 1.544 MHz master clock shown in waveform I. The output signal appears at port Q3 in substrate X5. During substrate X5, the signal on lead 1705 from the $\overline{Q}_3$ port is removed, thereby assuring that a microcomputer ordered read or write operation will not be repeated erroneously on the following substrate X3 or X7. In order to prevent lead 1705 from being enabled in substrate X6, and thereby enabling AND gate 1702, the $Q_3$ output lead 1729 from D flip-flop 1714 is fed back to one input of OR gate 1712. This feedback arrangement extends the delay indefinitely, as shown in waveform XI in FIG. 18. The flip-flop 1714 is cleared by the signal on lead 1733 when the select signal on lead 1701 is removed.

The output from D flip-flop 1714 is transmitted to D flip-flop 1716 on lead 1727 in substrate X5. In substrate X6, the busy signal, transmitted on lead 1731 to microprocessor 700 and started prior to the select signal on lead 1701 being clocked into flip-flop 1700, will be removed, as shown in waveform XII. Indeed, flip-flop 1716 is used to compensate for the further signal propagation delay through the TSI of FIG. 8 to reach the microprocessor 700 of FIG. 7.

After microprocessor 700 has received the word read from interface multiplexer 832 of FIG. 8, or has noted the change in status on busy lead 1731, the signal on select lead 1701 will be removed. Removal of the signal on select lead 1701 causes the $\overline{Q_1}$ output of the D flip-flop 1700 to change its output lead 1733 to logic 1, thereby clearing flip-flops 1714 and 1716. It may be added that, in substates X3 and X7, when no instructions are received from the microprocessor 700, the TSI RAM 810 in FIG. 8 is read as if the microcomputer had legitimately requested a word to be read. The address of the word read is supplied by the common control circuit 820. The word read from TSI RAM 810, in this case, would be a random word on output bus 817 but no action would be taken.

The read-write instruction lead 1715, the select lead 1701 and the busy lead 1731 are shown as leads 819 in FIG. 8, from microprocessor 700 to the common control circuit 820. The address information from microprocessor 700 of FIG. 7 appear on bus 815. Under control of common control circuit 820, address multiplexer 822 causes the addressed word to be read from TSI RAM 810 and transmitted on output bus 817 to register 830 in substates X4 or X0. The word entered in register 830 will be transmitted to interface multiplexer 832 in substates X5 or X1. From interface multiplexer 832, the word will be transmitted to microprocessor 700 when the microprocessor 700 is ready to receive it. If the instruction from the microcomputer is a write, the word to be written in TSI RAM 810 will be transmitted from buffer 824 through multiplexer 808 for storage in TSI RAM 810.

Transmit TSI Synchronization

Figure 19:
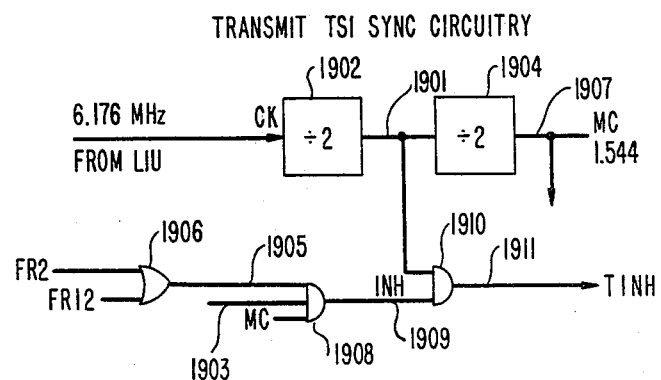
FIG. 19 is a detailed logic diagram of the synchronizing circuit for the transmit time slot interchanger of FIG. 8.
Figure 20:
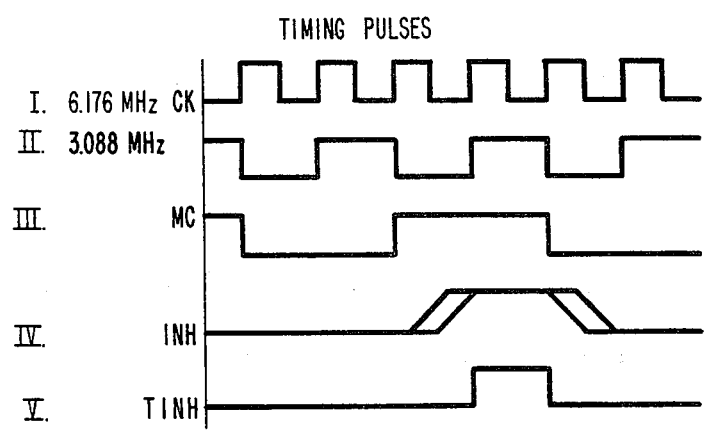
FIG. 20 is a timing diagram for the transmit time slot interchanger synchronizing circuit shown in FIG. 19.

Referring to FIG. 19, there is shown detailed logic circuitry for synchronization of transmit TSI 120 with master TRU 114 and slave TRU 116. FIG. 20 shows timing waveforms associated with the synchronization circuit in FIG. 19. A 6.176 MHz clock signal from LIU 126, shown as waveform I in FIG. 20, appears at the input of the divide-by-two circuit 1902. A 3.088 MHz clock signal, shown as waveform II in FIG. 20, appears on lead 1901 at the output port of the divide-by-two circuit 1902 for transmission to the divide-by-two circuit 1904 and, simultaneously, AND gate 1910. The output from divide-by-two circuit 1904 appears on lead 1907 as the master clock signal at 1.544 MHz, which is shown as waveform III in FIG. 20, for transmission to TSI 120 and AND gate 1908.

The synchronization pulse pattern comprises two pulses, each one 6.176 MHz period wide, in substate G5W3X3, namely, in control counter state 187, appearing in frames 2 and 12. The control counter pulse from control counter 1500 of FIG. 15, appearing on lead 1903 in substate G5W3X3, terminates at AND gate 1908. Control counter pulses in frame twelve and in frame two from control counter 1500 terminate at OR gate 1906. The output of OR gate 1906 appearing on lead 1905 is clocked in synchronization with the master clock at AND gate 1908 for transmission over lead 1909 to enable AND gate 1910.

The output of AND gate 1908 is shown as waveform IV in FIG. 20. The diagonal lines in waveform IV indicate that the transition from the disable to the enable state might take some time and is not precise. However, the output signal INH will be stabilized before the rising edge of the corresponding 6.176 MHz clock pulse. The output from AND gate 1910 is a 6.176 MHz clock period wide pulse, shown as waveform V, and is transmitted over lead 1911 to the TRU's 114 and 116 for synchronization with transmit TSI 120. Lead 1911 is also shown in FIG. 8 as lead 821 and lead 1907 is also shown in FIG. 8 as lead 823. Synchronization for receive TSI 122 is obtained from the clock derived from the concentrated PCM signals received at LIU 126 and will be described in detail below.

Communication between COT concentrator 110 and RT concentrator 112 is made possible by the transmission of data messages comprising three words each. As described in connection with FIGS. 2 and 3, each data word, eleven bits long, is transmitted from microprocessor 700 of FIG. 7 to register 812 of FIG. 8 as two words: a first word comprising eight bits and a second word comprising the other three bits. Referring to FIG. 8, each of these words is transmitted in sequence from the microprocessor 700 to the buffer 824 and from the buffer 824 to register 812. When both words have been entered in register 812, under direction from common control circuit 820 the words are transmitted serially as bits on lead 825 to DLU 118, shown in FIG. 1.

Referring briefly to FIG. 1, when a data word has been received from RT concentrator 112 and entered in DLU 118, the data word is transmitted over lead 137, shown in FIG. 8 as lead 827, for entry into register 812. Under control of common control circuit 820, the data word in register 812 is transmitted (when the microcomputer is ready to receive it) through interface multiplexer 832 to microcomputer 124. Such an arrangement is possible when the TSI shown in FIG. 8 operates as a receive TSI such as TSI 122 of FIG. 1.

Data Link Clock Circuit

Figure 21:
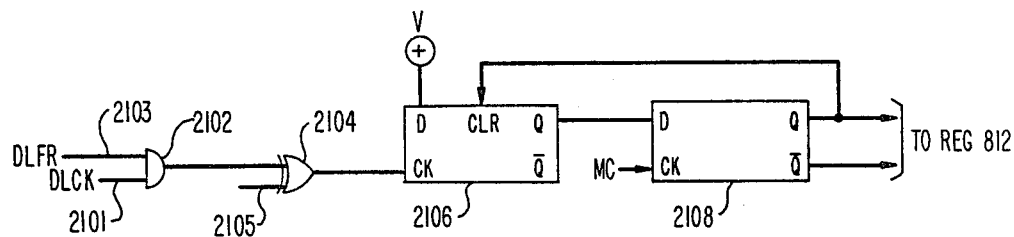
FIG. 21 is a detailed block diagram showing the derivation of a data link clock in the time slot interchanger of FIG. 8.
Figure 22:
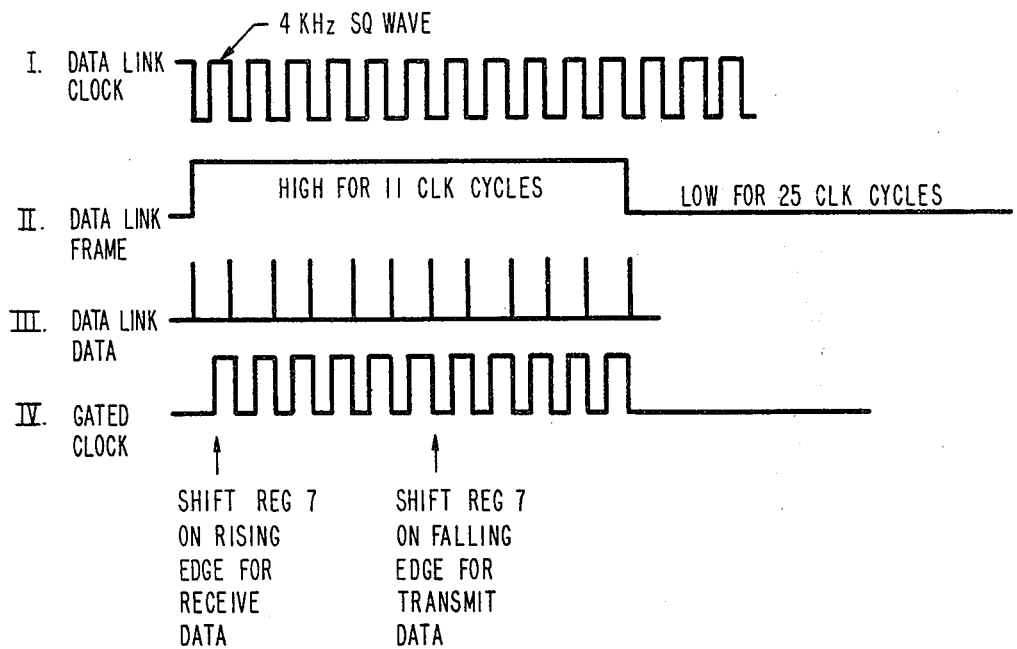
FIG. 22 is a timing diagram showing the timing signals for the data link messages, useful in understanding the operation of the data link clock circuits of FIG. 21.

Referring to FIG. 21, there is shown a detailed diagram of a data link control circuit which is part of the common control circuit 820 for controlling register 812. FIG. 22 is a timing diagram showing the data link signals, and is to be read in conjunction with FIG. 21. Referring to FIG. 1, leads 127 from transmit TSI 120 to the DLU 118 is shown, for convenience, as a single lead. In fact, three separate leads are used. A 4 KHz squarewave data clock, shown as waveform I in FIG. 22, is transmitted from DLU 118 on lead 2101 to AND gate 2102 of FIG. 21. A data link frame signal, shown as waveform II in FIG. 22, is a single pulse, persisting for eleven periods of the 4 KHz clock signal which is transmitted from DLU 118 to AND gate 2102 on lead 2103.

By gating the data link clock with the data link frame signals at AND gate 2102, a stream of eleven pulses (waveform IV of FIG. 22) is obtained. Pulses shown in waveform IV are used for shifting the data link register 812, either for entering the received data message words from DLU 118, or for transmitting data message words to DLU 118. The stream of shift pulses from AND gate 2102 is transmitted to the exclusive OR gate 2104. Lead 2105 to exclusive OR gate 2104 transmits a logic one when TSI 122 is operating in the receive mode. When TSI 120 is operating as in the transmit mode, lead 2105 will transmit a logic zero. In the transmit mode, when the stream of shift pulses from AND gate 2102 is received at exclusive OR gate 2104, these pulses are transmitted through D flip-flop 2106 to D flip-flop 2108. It is assumed that the data link clock and the data link frame signals are asynchronous with respect to the master clock. Consequently, the stream of shift pulses must be synchronized to the master clock at D flip-flop 2108.

The gated clock pulses from D flip-flop 2108 are transmitted to data link shift register 812. The rising or falling edges of the gated clock pulses correspond with the rising or falling edges of the pulse pattern shown in waveform IV. However, since the gated clock pulses correspond with the master clock at 1.544 MHz, they will be considerably narrower than the pulses in waveform IV. When operating in the transmit mode, the first data bit will be available for transmission to DLU 118 as soon as a data word is entered into data link register 812 and no shift pulse is needed. The first shift pulse then will cause the second bit of the data word to be transmitted from data link register 812 to DLU 118 on the falling edge of the gated clock pulse described above.

When operating in the receive mode, the receive bits are shifted into the data link register 812 on the rising edge of the gated clock pulses by inversion of the gated clock in exclusive OR gate 2104. During the time taken for entry of a data message word into or transmission from data link register 812, no message words from microprocessor 700 to data link register 812 are permitted. To assure this, the data link frame lead (part of lead 137 in FIG. 1) will be periodically polled, asynchronously with respect to the TSI operation, directly by microprocessor 700 through input port 710 by noting the "1-to-0" and the "0-to-1" transitions of the frame signal, shown to in FIG. 22, diagram II.

Referring to FIG. 1, a single lead 137 connects DLU 118 to receive TSI 122. In fact, lead 137 comprises three separate leads for transmission of a 4 KHz data link clock signal on one lead, a eleven 4 KHz clock period wide data link frame signal on a second lead and the data message word on a third lead to receive TSI 122. The operation of receive TSI 122 for receiving the data link words was described earlier.

Reframing Circuit

Whereas, in the transmit mode, TRU's 114 and 116 are synchronized to transmit TSI 120, in the receive mode, receive TSI 122 is synchronized to the master TRU 114. When framing is lost at master TRU 114, an out-of-frame signal (OOF) is transmitted from master TRU 114 on lead 145 to receive TSI 122. A special mode of operation is entered at receive TSI 122 for introducing the same delay into the transmission of the PCM streams as in normal operation. However, the same concentrated PCM stream as received at the receive TSI 122 is transmitted to both master TRU 114 and to slave TRU 116, without expansion. This is done for three reasons: firstly, the TRU's 114 and 116 need the framing bits embedded in the concentrated PCM stream to achieve reframing; secondly, the framing bit that enters the concentrator terminal must be identified because the framing bit may well have been entered as part of a PCM word into receive TSI 122, and thus lost in the expansion process; and thirdly, as will be described later, the frame bit must be collated with the corresponding PCM words in the same frame to permit recovery of signaling superframe bits, namely, the 000111000—transitions of the supervisory framing bit pattern which identify the PCM frames with the signaling bits. When master TRU 114 has achieved reframe, the OOF signal on lead 145 is removed. Receive TSI 122 then enters a mode of reinitializing the part of its RAM 810 that was used during reframing.

Figure 23:
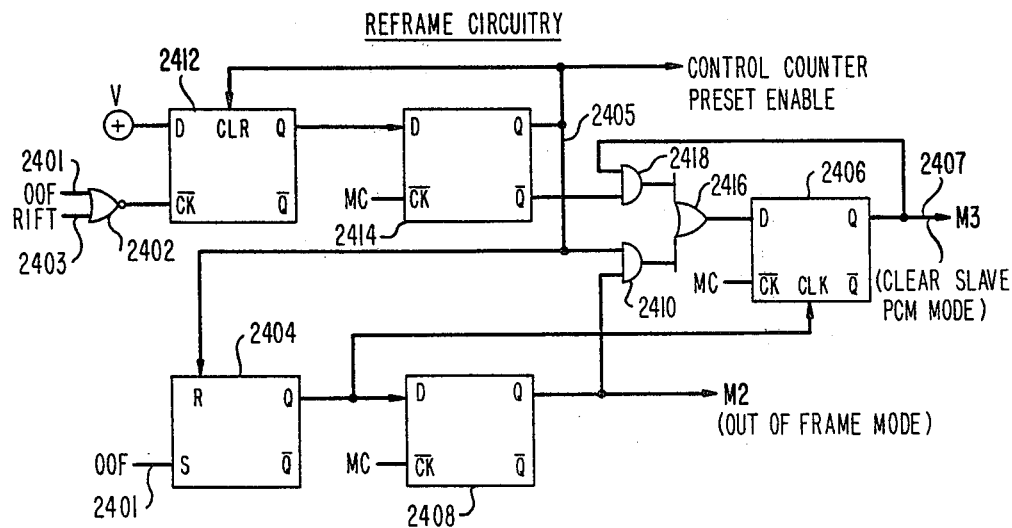
FIG. 23 is a detailed block diagram showing the reframing circuitry in in FIG. 14.
Figure 24:
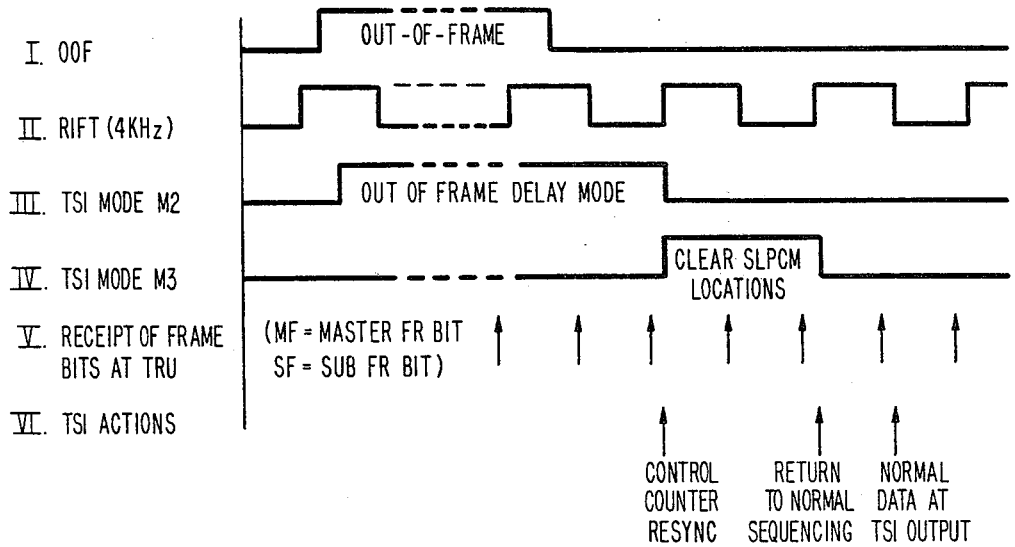
FIG. 24 is a timing diagram associated with the reframing circuitry in FIG. 23.

Referring to FIG. 23, there is shown a reframing circuit for use both at receive TSI 122 and at receive TSI 162, and also shown as reframing circuit 1404 in FIG. 14. The timing diagrams in FIG. 24 are to be read concurrently with FIG. 23. For convenience, the OOF signal is shown as a single lead 145 in FIG. 1. In fact, there are two signals present on two separate leads: an OOF signal on lead 2401 and a 4 KHz clock signal on lead 2403. An OOF signal, shown as waveform I in FIG. 24, from master TRU 114 appears on lead 2401 at NOR gate 2402 and at the set input of RS flip-flop 2404. The Q output from RS flip-flop 2404 clears flip-flop 2406. The output from RS flip-flop 2404 is also clocked by the master clock at D flip-flop 2408 to produce a signal, M2, at its Q port. The signal M2 is shown in waveform III of FIG. 23 as the out-of-frame mode signal for transmission to microprocessor 700 of FIG. 7, sequencer 1400 of FIG. 14 and AND gate 2410.

During the reframing mode, concentrated PCM data words are stored sequentially in odd numbered frame locations in section 1 of TSI RAM 810, in the storage bytes reserved for the PCM words for the slave channel units of group 128. In even numbered frames, the concentrated PCM words are stored in bytes reserved for the slave channel units of group 128 in section 2 of TSI RAM 810. The concentrated PCM words stored in section 1 of TSI RAM 810 are sequentially read-out and transmitted simultaneously to both master TRU 114 and slave TRU 116. Should the framing bit be stored as part of a word because receive TSI 122 is out of synchronization with TRU 114, the same bit sequence will be preserved in the multiplexed PCM stream transmitted from the TSI shown in FIG. 8, as is received from RT concentrator 112, thereby enabling master TRU 114 and slave TRU 116 to achieve reframing.

The second lead from master TRU 114 is a 4 KHz clock signal, called RIFT, shown as waveform II and appearing on lead 2403 at NOR gate 2402. When reframing is achieved at master TRU 114, the out-of-frame signal is removed from lead 2401. Thereupon NOR gate 2402 clocks D flip-flop 2412 with the 4 KHz signal. The Q output signal from D flip-flop 2412, in turn, is clocked into another D flip-flop 2414 with the 1.544 MHz master clock, presenting a 1.544 MHz period wide pulse on lead 2405, which is fed back to clear D flip-flop 2412. The two D flip-flops 2412 and 2414 together operate to produce a single 1.544 MHz period wide clock pulse: D flip-flop 2412 catches the leading edge of the 4 KHz clock pulse; D flip-flop 2414 synchronizes the signal at its D port with the 1.544 MHz master clock and the feedback signal on lead 2405 clears D flip-flop 2412 so that the output signal on lead 2405 is only a one 1.544 MHz clock period wide pulse. D flip-flops 2412 and 2414 perform a function identical to that performed by D flip-flops 2106 and 2108 in FIG. 21, i.e., synchronizing the data link signals.

The signal on lead 2405 presets the control counter 1500 of FIG. 14 to state 15, as is shown in FIG. 6, waveform X, thereby providing synchronization between receive TSI 122 and master TRU 114 and slave TRU 116. The signal on lead 2405 also resets the RS flip-flop 2404, thereby causing the removal of the M2 signal. The removal of the M2 signal is delayed sufficiently long to permit enabling AND gate 2410, as will be described below.

The preset signal on lead 2405 also terminates on AND gate 2410. A signal from AND gate 2410 transmitted through OR gate 2416 when signal M2 is present, sets D flip-flop 2406, thereby enabling lead 2407. The M3 signal on lead 2407, derived from the Q port of the D flip-flop 2406, is a four kHz period wide pulse, shown as waveform IV in FIG. 24. This four kHz period wide pulse is equivalent to two frames and is sufficiently long to permit the slave storage bytes of sections 1 and 2 of TSI RAM 810 to be reinitialized, in preparation for the resumption of normal operation.

The output of lead 2407 is also fed back to AND gate 2418 to maintain the M3 signal until the next preset pulse. Since the output on lead 2405 from D flip-flop 2414 is only one master clock period wide, when the signal on lead 2405 disappears in the next master clock period, the $\overline{Q}$ output from D flip-flop 2414 continues to enable AND gate 2418, permitting transmission of the feedback signal on lead 2407 through AND gate 2418 and OR gate 2416, thereby maintaining flip-flop 2406 in a set state until the next synchronization pulse on lead 2403 occurs, two frames later.

After reframing, control counter 1500 is preset to state 15. When receive TSI 122 is synchronized with master TRU 114 and slave TRU 116, control counter 1500 will normally be changing to state 15 when the preset pulse is transmitted on lead 2405. When such a preset pulse is transmitted, the signal from the $\overline{Q}$ port of flip-flop 2414 is removed, thereby removing the M3 signal from lead 2407. Because the M2 out-of-frame signal is no longer present, AND gate 2410 is not enabled by the recurring preset pulse on lead 2405. The M3 signal is thereby restricted to the two PCM frames following the removal of the M2 signal and will not trigger reinitialization of RAM 810 at any other time. Diagram V correlates the terminal frame bits and the supervisory frame bits, described earlier in FIG. 4, with the reframing sequence. Diagram VI correlates the control counter resynchronizing pulse, shown in FIG. 6, with the reframing sequence.

Initialization Circuitry

Figure 25:
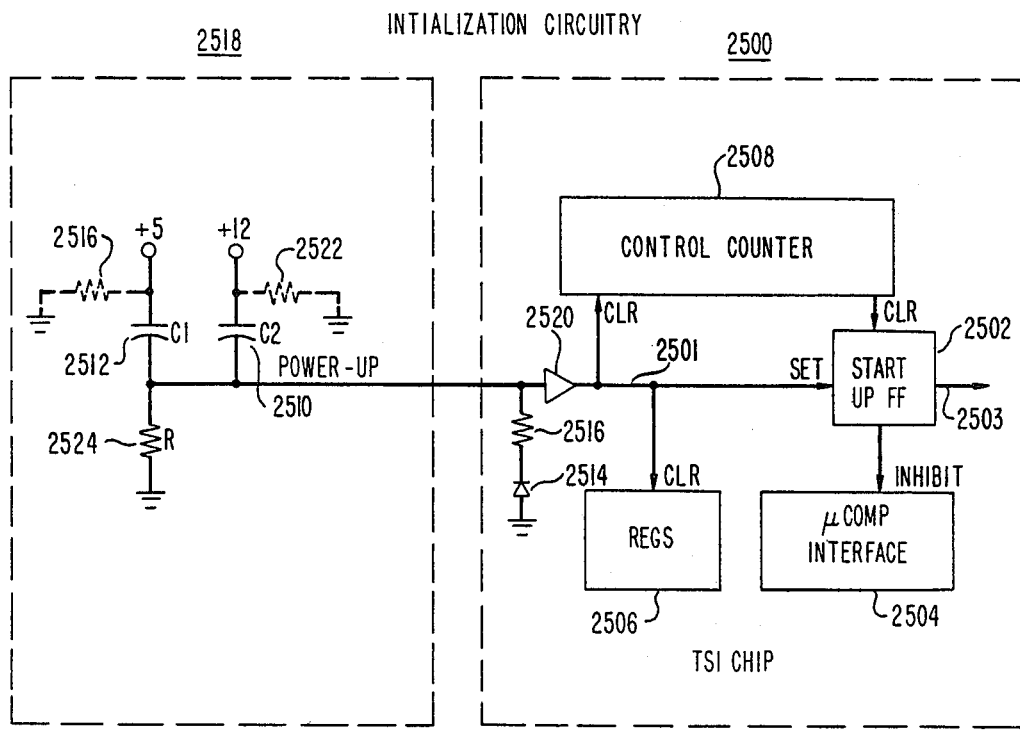
FIG. 25 shows a detailed block diagram of the initialization circuitry for the time slot interchanger of FIG. 8.
Figure 26:
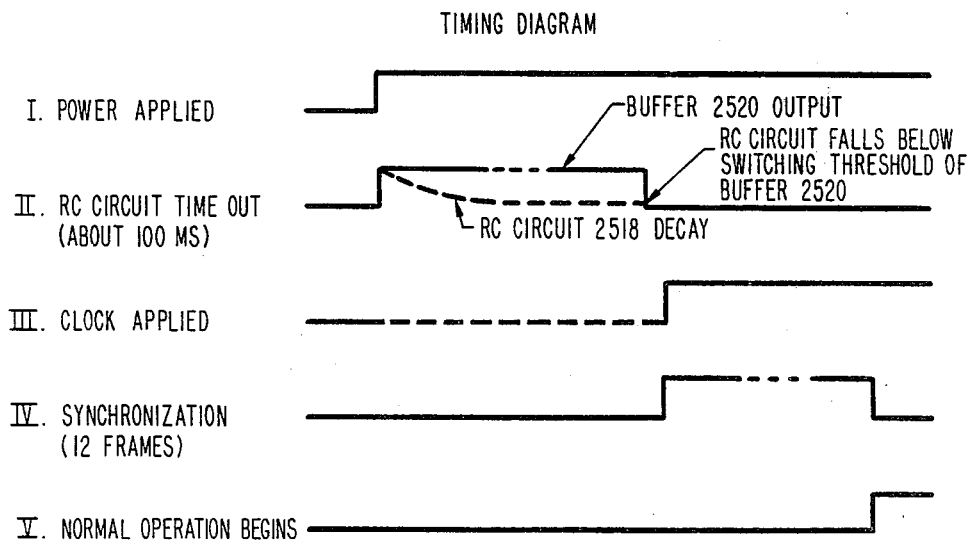
FIG. 26 is a timing diagram associated with the initialization circuitry of FIG. 25.

Referring to FIG. 25, there is shown an RC timing circuit 2518 for initialization of a TSI circuit 2500. Timing diagrams shown in FIG. 26 are to be read concurrently with FIG. 25. TSI 2500 is initialized at the start-up of operations and whenever there is a momentary interruption in the power supply. External RC circuit 2518 comprises voltage sources of +5 volts and +12 volts connected through capacitors 2512 and 2510, respectively, to power-up lead 2501 interval to TSI 2500.

When power is applied (waveform I in FIG. 26), the power-up signal on lead 2501 (waveform II) clears the control counter 2508, clears the supervision register 2506 (register 826 in FIG. 8) and sets start-up flip-flop 2502. The output from start-up flip-flop 2502 is transmitted to state decoding circuitry 1502 (FIG. 15) via lead 2503 to control the decoding circuit 1502. When start-up flip-flop 2502 is set, microcomputer interface circuit 2504 (also shown as 832 in FIG. 8) is temporarily inhibited.

Should there be a momentary interruption in power, capacitors 2512 and 2510 will discharge through resistors 2516 and 2522 connected to ground. The normal load of the circuitry on the +5 volts and the +12 volts power supplies are shown for convenience as resistors 2516 and 2522, respectively. The discharge current flows quickly through ground and returns through diode 2514 and resistance 2516 to the capacitors 2512 and 2510 to discharge the capacitors 2510 and 2512. Lead 2501 is isolated by buffer gate 2520.

When power is again available, there will be an immediate flow of charging current producing a clear signal to TSI 2500. The effect of the RC circuit is to cause the charging current to decay as capacitors 2510 and 2512 are charged. When the output voltage of the RC circuit 2518 drops below the switching threshold of the buffer gate 2520, the buffer gate output switches to a logic "0." The output of the buffer gate 2520 appears as a pulse shown in waveform II of FIG. 26. The buffer 2520 also provides gain for the input signal so that the output signal from buffer 2520 is a square pulse (waveform II).

When the next clock signal from LIU 126 (shown in waveform III as arbitrary in time) is available after RC circuit 2518 times out, a second phase of operation, twelve frames long (waveform IV), begins. During this period of twelve frames, synchronization pulses appearing in frames 2 and 12 are transmitted from TSI 2500 to master and slave TRU's 114 and 116, respectively.

Additionally, during the twelve frame period, all memory cycles are made writes, i.e., no reads are permitted. All microcomputer 124 read/write requests are ignored. Referring briefly to FIG. 8, data multiplexer 808 is forced to connect with buffer 824 so that an idle code data word entered in buffer 824 may be transmitted to RAM 810 for initialization. All trunk assignment words are also initialized. For initializing the PCM memory, however, the least significant bit is set to be a "0" or a "1" to correspond with the idle signaling state at that terminal ("0" at COT 100 and "1" at RT 102). Furthermore, as mentioned earlier, the supervision control register 826 is inhibited so that, at the termination of the initialization sequence, RAM bytes will not be altered until register 826 is set once more by microcomputer 124. After the twelve frame long initialization sequence is terminated, start-up flip-flop 2502 is reset by control counter 2508 and normal operation of TSI 2500 is resumed as shown in waveform V.

Time Slot Interchanger Operation

Transfer of PCM Words From Lines to Concentrator Trunks

Referring again to Table 2 and to FIGS. 1 and 8, in the transmit TSI's, PCM words from master TRU 114 at the COT 100 or master TRU 154 at the RT 102 are entered consecutively in serial-to-parallel register 800. Likewise, PCM words from slave TRU 116 at COT 100 or slave TRU 156 at RT 102 are entered consecutively in serial-to-parallel register 806. As stated earlier, PCM words are read alternately from register 800 in substate X4 and from register 806 in substate X5 for transmission through data multiplexer 808 to TSI RAM 810. Because only one PCM word can be entered at a time, flip-flop 804 is introduced in the slave PCM path to cause a one bit delay. PCM words from the master and slave PCM streams, i.e., from registers 800 and 806, are sequentially entered in sections 1 or 2 of TSI RAM 810—first a master PCM word, then a slave PCM word, again a master PCM word and so on.

Activity words indicating the status of lines are stored in section 3 of TSI RAM 810. Periodically, these activity words are transferred to the microcomputer 124 at COT 100 and to microcomputer 160 at RT 102. At the microcomputer, changes in the status of a line are detected. The activity bit is correlated with a designated line according to an algorithm described earlier in connection with FIG. 12. Class or service words, also stored in section 3 of RAM 810, are periodically transferred to microcomputer 124 or 160. If service is requested, then a vacant concentrator trunk is assigned to the line. The line number, as stated earlier, comprises six bits ($2^6=48$). The two remaining bits of a trunk assignment word are the enable bits for two lines: a master and a slave. The lines corresponding to the enable bits do not correspond to the line number assigned to the concentrator trunk. Operation of these bits will be described below.

The line-to-concentrator trunk assignment eight-bit word is transferred through buffer 824 and data multiplexer 808 for storage in section 3 of RAM 810. The assignment word is stored in a byte corresponding to the particular trunk location. As described earlier in connection with FIGS. 9 and 10, there are twenty-four bytes in section 3 of RAM 810 of every TSI, both transmit and receive. The assignment words in each of these twenty-four bytes are not entered in any predefined order; they are entered by microcomputer 160 in response to demand and in such a way as to insure uniform distribution of load between the trunks. Furthermore, the entry of these words is possible only during substates X3 or X7 when the microcomputer 124 or 160 has access to the TSI.

Each of the twenty-four assignment bytes in transmit TSI 120 or 164, however, are read sequentially in X0 substates. In the following X1 substrate, as described in connection with FIG. 13, the eight-bit assignment word is transferred from RAM 810 to the feedback register 816. In substate X2, the six line address bits are transmitted through address multiplexer 822 to address the location of a PCM word in either section 1 or 2. In any frame, PCM words in only section 1 or 2 are addressed. In substate X3, the PCM word that was read from section 1 or 2 in substate X2 is transferred to parallel-to-serial register 818. Under direction from common control circuit 820, each bit from the PCM word in register 818 is serially shifted out for transmission to the distant terminal.

When a concentrator trunk is not assigned to a line, an assignment addressing an idle code word (all zeroes) is entered therein. Thus, the idle code is transmitted whenever a trunk is unassigned.

Addressing of PCM words in sections 1 and 2 in alternate frames by sequentially reading the twenty-four assignment words in section 3 is equivalent to selectively reading up to twenty-four of the forty-eight PCM words in section 1 or 2, thereby performing the concentration function. Furthermore, consecutive reading of the PCM words and transmission through register 818 performs the multiplexing of the twenty-four PCM words.

It was stated earlier that the master PCM stream enters the TSI on lead 801. The master framing bit, appearing in 193rd bit position, is clocked into and stored in frame flip-flop 834. It was also stated earlier that in substate X3 a PCM word will be transferred from RAM 810 to register 818. After the twenty-fourth such PCM word is transferred to register 818 in substate X4, and while it is being shifted out, the frame bit from the master PCM stream stored in frame flip-flop 834 is shifted into register 818. In register 818, the frame bit is inserted in the 193rd bit position. Simultaneously, as the frame bit stored in frame flip-flop 834 is read out, the frame bit from the next master PCM stream is written in.

As stated earlier in connection with FIG. 4, diagram V, signaling bits are embedded in PCM words every sixth frame. In order to recover these signaling bits properly, it is necessary to insure that all PCM words in one frame are separated from PCM words in any other frame. This is achieved by the use of two sections of memory, one for sequential entry PCM words, the other for simultaneous and selective read-out of PCM words. For the same reasons, it is also necessary to delay each master frame bit to associate it with the corresponding PCM words of the same frame from which they were demultiplexed. In substate X1, an eight-bit assignment word is transferred from section 3 of RAM 810 to feedback register 816. Two of these bits are enable bits, X and Y, and may not correspond to the line assignment entered in the remaining six bits. In substate X4, if the enable bit X is zero, the master PCM word in register 800 will not be transferred to RAM 810 in substate X3 or X7. Instead, a PCM looping test code word, transferred from microcomputer 124 or 160 to RAM 810 in substate X3 or X7, will remain stored in RAM 810. Similarly, in substate X5, if the enable bit Y is a zero, the slave PCM word in register 806 will not be transferred to RAM 810. Thus, a PCM looping test code word will be transferred from the microcomputer to RAM 810 and remain unchanged in the memory. At the termination of the PCM looping test, the enable bits will be set to ones. Thereafter PCM words from registers 800 and 806 will be transferred to the RAM 810.

RECEIVE TIME SLOT INTERCHANGER OPERATION

Transfer of PCM words From Concentrator Trunks to Lines

Referring to Table 3 and to FIGS. 1 and 8, in the receive TSIs 122 and 162, the concentrated PCM stream from a distant transmit TSI 164 or 120, respectively, received on lead 801 is entered, one PCM bit at a time, into serial-to-parallel register 800. The frame bit is clocked into flip-flop 834. Each of the twenty-four received PCM words is selectively entered in alternate frames in sections 1 and 2.

Section 3 of RAM 810 in the receive TSI's 122 and 162, as described earlier, comprises a group of twenty-four assignment bytes. As in a transmit TSI, each line-to-concentrator trunk assignment word is transferred from the microcomputer for storage in these assignment bytes.

All assignments are made by microcomputer 124 for both COT 100 and RT 102. The assignments are transferred directly from microcomputer 124 to transmit TSI 120 and to receive TSI 122, at the COT 100. Assignments are transmitted from microcomputer 124 at the COT 100 to microcomputer 160 at the RT 102 over the data link described in connection with FIG. 2. Assignments at the RT 102 are then transferred from microcomputer 160 to transmit TSI 164 and to receive TSI 162.

Returning to the operation of receive TSI's 122 and 162, in substate X1 the assignment word from section 3 of RAM 810 is read. In the following X2 substate, this eight-bit assignment word is transferred from RAM 810 to feedback register 816. Six of these bits address sections 1 and 2 of the RAM 810 in alternate frames through address multiplexer 822. In substate X6, the PCM word from the distant terminal, now stored in register 800, is transferred to RAM 810 for storage in section 1 or 2 as addressed by the assignment word. Thus, by sequentially reading the twenty-four assignment words from section 3 of RAM 810, storing the words in feedback register 816, and addressing a storage byte in section 1 or 2, each PCM word from a concentrator trunk is selectively stored. These trunk PCM words from register 800 are stored in alternate frames in sections 1 and 2.

As the twenty-four trunk PCM words are being selectively entered in one section, previously stored trunk PCM words in the forty-eight bytes of the other section are sequentially read. Because only up to twenty-four of these PCM words have information, the other words are stuffed with idle code. In substate X4, the master PCM word is read from RAM 810. In substate X5, the master PCM word is entered in parallel-to-serial register 818. Also in substate X5, the slave PCM word is read. In substate X6, the slave PCM word is entered in parallel-to-serial register 806.

Because PCM streams from registers 818 and 806 must be transmitted simultaneously to the respective TRU's 114, 154, 116 or 156, a one bit delay is introduced in the master PCM stream. Thus, a flip-flop 836 is connected to the output lead of register 818.

The frame bit from the concentrated PCM stream, previously entered in frame flip-flop 834, is transferred during substate X7 to both of registers 818 and 806. This is achieved, partially, by introducing a selector 802 which connects flip-flop 834 to register 806 when a TSI operates in the receive mode.

The sequential transfer of twenty-four PCM words from RAM 810 to each of registers 818 and 806 and the insertion of the framing bit in the 193rd bit position is equivalent to generating two multiplexed PCM streams. These PCM streams are substantially identical to the streams transmitted from the distant terminal. The only difference is the loss of the original framing bit from the slave PCM stream and the insertion of idle code on unused lines. Instead of the original slave frame bit, the slave PCM stream is supplied with the master frame bit. Indeed, only the frame bits from the master PCM stream are used to derive the data link as described earlier in connection with FIG. 4.

Referring back to feedback register 816, the two remaining nonaddress bits are enable bits X and Y. In the receive TSI's, these enable bits, as in the transmit TSI's, do not necessarily correspond with the PCM line code in the assignment word. The enable bits X and Y inhibit the transfer in substate X5 and X6 of PCM words from RAM 810 to registers 818 and 806, respectively. Instead, the registers 818 and 806 generate idle code words for transmission to the lines. Such a procedure prevents the transmission of PCM looping test code words to lines during the PCM looping test prior to establishing a concentrator trunk-to-line connection.

A TELEPHONE CALL SET UP

Assume a subscriber at station 49, connected to RT 102, demands service. The request for service is transmitted as an off-hook signal on line 1 to CU1. The off-hook signal from CU1 is transmitted over bus 155 to transmit TSI 164 where activity bits from the other channel units are also collected in register 826, FIG. 8, for storage in RAM 810 as an activity word.

A read command from microcomputer 160 is transmitted on leads 819 which is terminated on common control circuit 820. Simultaneously, an address from microcomputer 160, pointing to the activity word to be read, is transmitted over address leads 815 to address multiplexer 822. Under command of common control circuit 820, the activity word in RAM 810 is read from the appropriate storage word in section 3 and transmitted over output bus 817 to register 830. From register 830 the activity word is transmitted to interface multiplexer 832 for transmission to microcomputer 160. At microcomputer 160 the activity word is decoded and a change in status for subscriber station 49, namely line 1, is noted.

Because concentrator trunk-to-line assignments are made at the COT concentrator 110, a data message requesting trunk assignment must be initiated at the microcomputer 160 for transmission to the COT concentrator 110. This is done by assembling a data message comprising activity information as shown in Block I of FIG. 3. The data message comprises three data words. One word at a time is entered through buffer 824 into data link register 812. Under control of common control circuit 820, the data word in register 812 is shifted out over data link lead 825, shown in FIG. 1 as lead 159, to DLU 158. The data word from DLU 158 is transmitted to master TRU unit 154 for insertion in the framing bit position in frames 26 through 72, shown in FIG. 4. The framing bits in master TRU 154 are multiplexed into the 193rd bit position in the PCM stream for transmission over lead 161 to transmit TSI 164.

Referring to FIGS. 1 and 8, when the last master PCM word is entered in register 800, the master framing bit is entered in frame flip-flop 834. In the subsequent frame, the PCM words are selectively read for transmission through register 818 to the receive TSI 122 at COT 100. In substate X4, after the last PCM word has been entered in register 818, the frame bit is transferred to register 818 for multiplexing in the 193rd bit position.

At the receive TSI 122 in COT concentrator 110, the concentrator trunk PCM stream is entered in register 800. The frame bit is entered in frame flip-flop 834. The frame bit is transferred in substate X7 to registers 818 and 806 for multiplexing into the expanded PCM streams. The expanded PCM streams are transmitted to the TRU's 114 and 116, respectively.

Referring to FIG. 1, the PCM streams, expanded at receive TSI 122, are transmitted over lead 117 to master TRU 114 and over lead 119 to slave TRU 116. Lead 131 bridges lead 117 to permit retrieval of the framing bits at DLU 118. At DLU 118, the data message comprising three words, each eleven bits long, is extracted from the master PCM framing bits for transmission over lead 137 to the receive TSI 122.

In the receive TSI 122, the data word on lead 827 is shifted into register 812 in synchronism with a data clock, shown earlier in FIGS. 21 and 22. On instructions from microcomputer 124, the data word in register 812 is transmitted through an interface multiplexer 832 to microcomputer 124.

At microcomputer 124, the data message is decoded and the change of status of the activity in subscriber station 49 is noted. An idle concentrator trunk is then assigned to the line. A data message, shown in FIG. 2 as Block I, is assembled for transmission through data link register 812 over lead 825 (lead 127 in FIG. 1) to DLU 118. Simultaneously, microcomputer 124 records the assignment of the particular concentrator trunk to line 1, namely subscriber station 49, and transmits the assignment to both transmit TSI 120 and receive TSI 122.

At DLU 118, the data word is transmitted, one bit at a time, to master TRU 114 for insertion in the framing bit positions in the multiplexed PCM stream, which is then transmitted over lead 113 to transmit TSI 120. As described earlier, the framing bit from the master PCM stream is multiplexed with the concentrated PCM stream at transmit TSI 120 for transmission over lead 123 to RT concentrator 112. At the RT concentrator 112, the concentrated PCM stream is expanded in receive TSI 162. The expanded streams are then transmitted over leads 165 and 167 to master TRU 154 and slave TRU 156, respectively.

Lead 169 bridged from lead 165 terminates at DLU 158 to permit extraction of framing bits from the master PCM stream. The data message is assembled at DLU 158 for transmission over lead 173 to receive TSI 162. In receive TSI 162, the data words from DLU 158 on lead 827 are shifted, one at a time, into data link register 812. Under instructions from microcomputer 160, the data word in register 812 is transferred through interface multiplexer 832 to microcomputer 160.

At the microcomputer 160, the assignment of the concentrator trunk to line 1, namely the subscriber station 49, is noted. The line concentrator trunk assignment is then recorded in both transmit TSI 164 and receive TSI 162. As described in detail in connection with FIGS. 9 and 10, however, prior to establishing connection of the concentrator trunk to line 1, a PCM looping test must be performed.

PCM LOOPING TEST

After a line-trunk assignment has been made at the COT microcomputer 124, the assignment is recorded in the corresponding storage location of the trunk in section 3 of both transmit TSI 120 and receive TSI 122. A trunk assignment message is assembled for transmission to the RT concentrator 112. Simultaneously, the enable bit corresponding to the line is cleared, as described earlier, and recorded in the corresponding location in section 3 of TSI RAM 810. Also, an eighty millisecond timer is started. The PCM test code word comprising alternating "1's" and "0's" is transmitted from microcomputer 124 through buffer 824 and multiplexer 808 for entry in sections 1 and 2 in the storage location corresponding to the line demanding service. The PCM codes are repetitively transmitted in the concentrator trunk as part of the multiplexed PCM stream to the RT 102.

At the RT concentrator 112, the trunk assignment data message is interpreted in microcomputer 160. The enable bits at the RT 102 are also cleared to permit the PCM looping test. The PCM test code word received at TSI 162 is stored in sections 1 and 2 in alternate frames. These PCM test code words are transferred through microcomputer 160 to the corresponding locations in sections 1 and 2 in the transmit TSI 164. From TSI 164, the PCM test code words are multiplexed for transmission to the COT concentrator 110.

At COT concentrator 110, the received PCM test code words are stored in the line locations in sections 1 and 2 of receive TSI 122. From receive TSI 122, the PCM test code words are transferred to microcomputer 124. At microcomputer 124 the test code words are compared with the original test code. If there is a match, the test code is complemented and the PCM test repeated as described above. At both the COT concentrator 110 and the RT concentrator 112, the microcomputers detect the received PCM test code and its complement by sampling the received PCM code at the receive TSI every two milliseconds.

When the complemented PCM test code is received at the COT microcomputer 124, an end-of-test PCM code comprising all ones is transmitted to the RT concentrator 112 for about ten milliseconds. At the end of this period, the enable bits will be set at the COT concentrator 110, thereby permitting transmission from the line to the concentrator trunk. At the RT concentrator 112, when the end-of-test code is received, the enable bits will be set, thereby permitting line to concentrator trunk "connection."

If the eighty millisecond timer, mentioned earlier, times out before the PCM test is completed, the trunk will be deassigned and the line-trunk combination will be stored at the microcomputer 124. An audible alarm will be sounded or a visual alarm displayed. The line-trunk combination will be retested at one second intervals thereafter to verify the fault and maintain an alarm. A two-bit, unequal attack-decay software counter is used to maintain the alarm by incrementing the counter everytime the test is performed and the fault found to exist. When the fault is no longer found on retests, the counter is decremented at three second intervals.

At the RT concentrator 112, if the test termination code is not received before a time-out occurs, the trunk is deassigned. The line-trunk combination is recorded only at the COT because subsequent line-trunk tests are done under control of the COT concentrator 110.

DEASSIGNMENT

At the termination of the call, i.e., when subscriber station 49 goes on-hook, the change in activity status is noted at the RT 102. The concentrator trunk is deassigned, as explained earlier in connection with FIG. 12, and then becomes available for use by another. That is, when the two bit activity filter comprising words 3 and 4 of FIG. 12 register a zero count, the trunk is deassigned. However, before deassignment, the RT activity status as recorded in word 5, FIG. 12, must be examined. Thus, both COT and RT activity status must register on-hook before deassignment occurs.

Before deassignment, a special scan is made to determine if any lines which have RT activity are assigned to a busy trunk at the COT. Should such a condition exist, the concentrator trunk is reassigned to the line being given a fast-busy signal after the busy signal is removed.

FAST-BUSY SIGNAL

Referring to FIGS. 1 and 8, when all twenty-four concentrator trunks are in use and if an activity signal is detected on a twenty-fifth line at COT 100, a method of alerting the central office and applying reorder tone on the line is provided. The change in status of the line is recorded as an activity bit which is part of an eight-bit activity word, stored in section 3 of TSI RAM 810 at transmit TSI 120. Periodically, this activity word is transmitted to microcomputer 124 (i.e., once every nine ms). At microcomputer 124, the activity word is interpreted. The fact that all trunks are assigned is noted at microcomputer 124 by scanning the six eight-bit line-trunk assignment status words ($6 \times 8 = 48$). For example, if a line is assigned, a "1" is recorded. By counting twenty-four such "1's", it can be determined that all trunks are busy. A fast-busy signal is then transmitted to the line to indicate that no concentrator trunks are available, i.e., all paths are busy. The silent interval of the fast-busy tone is provided by transmitting idle PCM code to the line.

The fast-busy (reorder) signal comprises a table of forty-eight PCM words stored in ROM 702, FIG. 7, associated with microcomputer 124. In any substate X3 or X7 of a frame, the microcomputer 124 is permitted access to the RAM 810. During one of these substates, a fast-busy PCM word from the forty-eight PCM word table in ROM 702 is transferred to section 3 in RAM 810 for storage as the fast-busy word. In subsequent frames, each PCM word is sequentially transferred from the table. Thus forty-eight frames are necessary to cycle through the table once ($\frac{1}{8}$ms$\times$48=6 ms).

In the last substate X0 of a frame (control counter state 192), the fast-busy PCM word is read from section 3 of RAM 810. In the following substate X0, the first substate of the subsequent frame, the fast-busy PCM word which is available on bus 817 is transferred to register 826. Register 826, thus, performs two functions. In the transmit TSI's 120 and 164, the register 826 is used for collecting activity bits. In receive TSI 122, however, register 826 holds the fast-busy word for one full frame. Consequently, anytime during this frame, the next fast-busy word can be transferred from microcomputer 124 to RAM 810.

Additionally, a line-to-fast-busy trunk assignment word is assembled at microcomputer 124. This busy assignment word is transferred, in either substate X3 or X7, to section 3 of RAM 810 of receive TSI 122. Each of the twenty-four busy assignment words in section 3 of RAM 810 is sequentially read out in substates X0. In substate X1, the busy-trunk assignment word is transferred to feedback register 816. In substate X2, the busy-trunk assignment stored in feedback register 816 addresses the line location, through address multiplexer 822, into which the fast-busy PCM word from holding register 826 is entered. Because section 3 of RAM 810 can store twenty-four busy-trunk address words, the fast-busy PCM word in holding register 826 can be written into twenty-four line locations in sections 1 and 2 of RAM 810.

Because every sixth frame the channel units expect to receive a signaling bit in the least significant bit position of the eight-bit PCM word, the least significant bit in the fast-busy tone word can be made to correspond with the signaling bit. This signaling function is achieved by permanently assigning to the least significant bit position a signaling code bit. Such an assignment does not incur any significant loss in quality of the fast-busy tone.

As stated earlier, PCM words in sections 1 and 2 are sequentially read and transmitted through the registers 818 and 806 to the master TRU 114 and to the slave TRU 116, respectively. In this way, the fast-busy signal is transmitted to the lines.

PATH OF A TELEPHONE CALL

Assume that a user at subscriber station 49, i.e., line 1, demands service. This demand for service is detected at the RT concentrator 112 as an off-hook signal. As described earlier, a data message is assembled at microcomputer 160 for transmission to microcomputer 124 at COT concentrator 110 for a line-to-concentrator assignment. A trunk is assigned and this assignment is transmitted to microcomputer 160 at RT 102 over a data link as described earlier. The assignment is recorded at all TSI's at both terminals. Subsequently, a PCM looping test is performed. If the test is successful, the trunk-to-line connection is made and the central office detects the off-hook status on line 1 by detecting the flow of current in the line circuit at the central office. Dial tone is then returned to subscriber station 49.

When the called party answers, a telecommunication path is established. Assuming that the user transmits analog signals such as voice signals on line 1 connected to RT 102, channel unit 1 samples the speech and transmits PAM samples to master TRU 154. Master TRU 154 sequentially receives PAM samples from the channel units in group 150. Similarly, slave TRU 156 sequentially receives PAM samples from channel units in group 152. The samples are encoded and multiplexed at the TRU's, as described earlier, and transmitted simultaneously to transmit TSI 164 as PCM bit streams.

At transmit TSI 164, the PCM words from each stream are sequentially entered in a first section of PAM 810 of FIG. 8 in one frame. In the next frame, the PCM words are entered in a second section of RAM 810. Simultaneously, twenty-four PCM words from the first section of RAM 810, including the PCM word from channel unit 1, are selectively multiplexed for transmission to the COT concentrator 110.

At COT concentrator 110, PCM words from the concentrated PCM stream, including the PCM word from channel unit 1, are selectively entered in a first section of RAM 810 in one frame. In the next frame, the PCM words are entered in a second section of RAM 810. Simultaneously, the PCM words from the first section are expanded. The master PCM words, including the one from channel unit 1, are multiplexed for transmission to the master TRU 114. Similarly, the slave PCM words are transmitted to the slave TRU 116.

At the master TRU 114, the PCM stream is demultiplexed and the PCM word from channel unit 1 is decoded and transmitted as a PAM sample to channel unit 1 in group 126. The PAM samples are converted to analog signals for transmission on line 1 to the central office switch. If the central office is a digital switch, it is conceivable that COT 100 can be modified for transmission of demultiplexed digital signals directly to the digital switch. Analog signals from the central office are transmitted through the concentrator system, that is, from COT 100 to RT 102 in the same way as described earlier for the transmission from RT 102 to COT 100.

During a call, a concentrator trunk is continually assigned to the same line. For special services, concentrator trunks are permanently assigned to the special service lines. In order to preserve the same concentrator ratio of 2:1, every special service channel unit takes the place of two lines.

At the end of a call, the concentrator trunk is deassigned as described earlier.

A listing of the program for operation of microcomputer 124 is included in the appendix. The listing of the program for operation of microcomputer 160, being simpler and similar to that for microcomputer 124, is not included. The microprocessor 700, used in both microcomputer 124 and microcomputer 160, is manufactured by the Western Electric Company, Inc., and is described in an article "MAC-8: A Microprocessor for Telecommunication Application," *The Western Electric Engineer*, at page 41 et seq., July 1977 by Herbert H. Winfield. Portions of this microcomputer is disclosed in U.S. patent application, Ser. No. 68,643, filed Aug. 22, 1979 by H. A. Lanty and assigned to the same assignee as the application herein.

I claim:

1. A method of real time testing of a transmission path through a digital concentrator system comprising a central office concentrator terminal (110), a remote concentrator terminal (112), and a digital line (108) Characterized by the steps of
   disabling the storage of encoded signals from subscriber lines (1,2,3 ... 48) to be connected to concentrator trunks,
   storing a looping test code word in place of the encoded signals from said subscriber lines,
   transmitting said looping test code word as part of a multiplexed stream to said remote concentrator terminal (112) over said concentrator trunks, and
   returning said looping test code word from said remote concentrator terminal (112) over said concentrator trunks, said concentrator trunks being part of said digital line.

2. The method of real time testing of the transmission path through the digital concentrator system according to claim 1 further Characterized by the steps of
   complementing the returned looping test code word in said central office concentrator terminal (110),
   transmitting said complemented test code word to said remote concentrator terminal (112) over said concentrator trunks,
   returning said complemented test code word over said concentrator trunks to said central office concentrator terminal (112), and
   comparing the received complemented test code with the transmitted complemented code at said central office concentrator terminal (110).

3. The method of real time testing of the transmission path according to claim 1 or 2 further Characterized by the steps of
   setting timers at each terminal prior to the start of the test,
   deassigning the line-to-concentrator trunk combination at both terminals (110,112) if the test is not successfully completed within the timed period,
   storing said combination in said central office concentrator terminal (110), and
   repeating said real time test periodically until the fault is cleared.

4. The method of real time testing of the transmission path through the digital concentrator system according to claim 1 or 2 further Characterized by the steps of
   disabling the transmission of either the looping test code word or the complemented test code word to the subscriber lines to be connected to the concentrator trunks under test at both terminals (110,112) at the beginning of said test, and
   transmitting an idle code word to the subscriber lines to be connected to said concentrator trunks during said test.

5. The method of real time testing of the transmission path through the digital concentrator system according to claim 2 further Characterized by the steps of
   transmitting an end-of-test code word over said concentrator trunk from said central office concentrator terminal (110) to said remote concentrator terminal (112), and
   thereafter enabling the entry of encoded signals from the subscriber line to be connected to said concentrator trunk under test at said central office concentrator terminal (110).

6. The method of real time testing of the transmission path through the digital concentrator system according to claim 5 further Characterized by the steps of receiving said end-of-test code word at said remote concentrator terminal (112), and thereafter enabling the entry of encoded signals from the subscriber lines to be connected to said concentrator trunks under test at said remote concentrator terminal (112).

7. Means for real time testing of a path and associated equipment through a digital concentrator system in subscriber loop digital carrier transmission systems comprising
   a central office concentrator terminal (110),
   a remote concentrator terminal (112),
   and a digital link (108)
Characterized by
   a microcomputer (124,160),
   a storage device (810),
   a feedback register (816),
   a plurality of serial-to-parallel registers (800,806),
   means for transmitting a disable code word from said microcomputer (124,160) through said storage device (810) to said feedback register (816) in order to prevent the transmission of signals between said plurality of serial-to-parallel registers (800,806) and said storage device (810), and
   means (800,806) for transmitting idle code words to the subscriber lines to be connected to concentrator trunks during a test, said concentrator trunks being part of said digital link.

8. Means for real time testing according to claim 7 further characterized by
   means (124) for transmitting a test code word to said storage device (810) for storage in a first section (1300) during one frame and in a second section (1302) during the subsequent frame in place of the encoded signals from said subscriber lines, and
   means (818) for multiplexing said code word as part of a stream of selected encoded signals from said storage device (810) for transmission to said remote concentrator terminal (112).

9. Means for real time testing according to claim 7 further Characterized by
   means at said remote concentrator terminal (112) for transmitting said test code word back to said central office concentrator terminal (110) over the same concentrator trunk.

10. Means for real time testing according to claim 7 further Characterized by
    means for complementing said test code word at said central office concentrator terminal (110) and transmitting said complemented test code word to said remote concentrator terminal (112), and
    means for returning said complemented test code to said central office concentrator terminal microcomputer (124).

11. Means for real time testing according to claim 10 further Characterized by
    means for transmitting an end-of-test code to said remote concentrator terminal (112) after receiving said complemented test code word correctly at said central office concentrator terminal (110).

12. Means for real time testing according to claim 7 further Characterized by
    means for timing said real time test at each said terminal (110,112),
    means for deassigning the line-to-trunk combination at said terminals (110,112) if the test is not successfully completed within the timed period,
    means for storing the line-to-trunk combination at said central office concentrator terminal (110) for periodic retesting until the fault is cleared, and
    means for generating an alarm control signal until said fault is cleared.

* * * * *